US012551917B2

(12) United States Patent
Fliess et al.

(10) Patent No.: US 12,551,917 B2
(45) Date of Patent: Feb. 17, 2026

(54) DOSING SYSTEM HAVING AN ADJUSTABLE ACTUATOR

(71) Applicant: VERMES MICRODISPENSING GMBH, Holzkirchen (DE)

(72) Inventors: Mario Fliess, Munich (DE); Klaus Mehrle, Passau (DE)

(73) Assignee: VERMES MICRODISPENSING GMBH, Holzkirchen (DE)

( * ) Notice: Subject to any disclaimer, the term of this patent is extended or adjusted under 35 U.S.C. 154(b) by 846 days.

(21) Appl. No.: 17/630,103

(22) PCT Filed: Jul. 24, 2020

(86) PCT No.: PCT/EP2020/070975
§ 371 (c)(1),
(2) Date: Jan. 25, 2022

(87) PCT Pub. No.: WO2021/028197
PCT Pub. Date: Feb. 18, 2021

(65) Prior Publication Data
US 2022/0280967 A1  Sep. 8, 2022

(30) Foreign Application Priority Data
Aug. 12, 2019 (DE) .................. 10 2019 121 679.6

(51) Int. Cl.
*B05C 5/02* (2006.01)
*B05C 5/00* (2006.01)
*B05C 11/10* (2006.01)

(52) U.S. Cl.
CPC ............ *B05C 5/0225* (2013.01); *B05C 5/001* (2013.01); *B05C 11/1002* (2013.01); *B05C 11/1026* (2013.01); *B05C 11/1034* (2013.01)

(58) Field of Classification Search
CPC ............. B05C 11/1002; B05C 11/1007; B05C 11/1026; B05C 11/1034; B05C 5/0225
See application file for complete search history.

(56) References Cited

U.S. PATENT DOCUMENTS

| 6,148,842 A | 11/2000 | Kappel et al. |
| 9,429,368 B2 | 8/2016 | Hong et al. |

(Continued)

FOREIGN PATENT DOCUMENTS

| CN | 104684656 A | 6/2015 |
| DE | 197 27 992 A1 | 1/1999 |

(Continued)

OTHER PUBLICATIONS

An Office Action; "Notice of Reasons for Refusal," mailed by the Japanese Patent Office on Aug. 6, 2024, which corresponds to Japanese Patent Application No. 2022-506541 and is related to U.S. Appl. No. 17/630,103.

(Continued)

*Primary Examiner* — Dah-Wei D. Yuan
*Assistant Examiner* — Stephen A Kitt
(74) *Attorney, Agent, or Firm* — Studebaker Brackett PLLC

(57) ABSTRACT

The invention relates to dosing system (1) for a dosing substance, which dosing system (1) comprises a housing (11) having a nozzle (60) and a feed channel (64) for dosing substance, a discharge element (51) arranged in the housing (11) for discharging dosing substance from the nozzle (60), at least one first actuator (20), preferably a piezo actuator (20), coupled to the discharge element (51) and/or the nozzle (60), and at least one second actuator (30), preferably an expansion material element (30), coupled to the first actuator (20). The second actuator (30) is designed to set a position of the at least one first actuator (20) relative to the housing (Continued)

Figure 1:
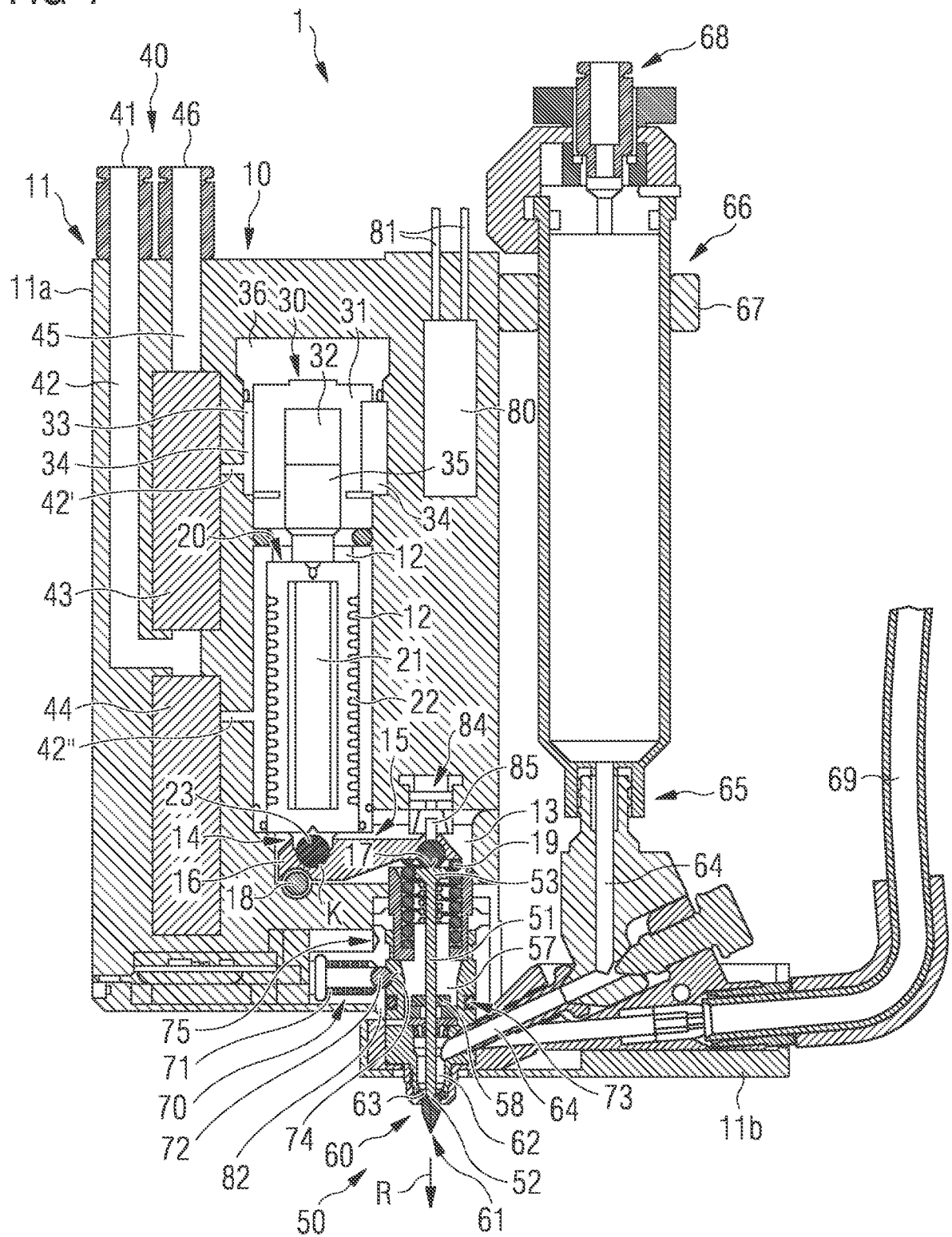

(11), particularly with respect to the discharge element (51) and/or the nozzle (60). The invention further relates to a method for controlling such a dosing system (1).

12 Claims, 10 Drawing Sheets

(56) References Cited

U.S. PATENT DOCUMENTS

| | | | |
|---|---|---|---|
| 9,457,935 B2 | 10/2016 | Fliess et al. | |
| 11,426,750 B2 | 8/2022 | Ikushima | |
| 2015/0274371 A1* | 10/2015 | Fliess | B65D 25/42 |
| | | | 222/1 |
| 2015/0300748 A1* | 10/2015 | Hong | F04B 13/00 |
| | | | 165/287 |
| 2016/0136661 A1 | 5/2016 | Hong et al. | |
| 2016/0339471 A1* | 11/2016 | Bittner | B05C 5/0225 |
| 2018/0071766 A1* | 3/2018 | Ikushima | B05C 11/1026 |
| 2021/0018353 A1 | 1/2021 | Fliess | |
| 2021/0023585 A1 | 1/2021 | Fliess et al. | |

FOREIGN PATENT DOCUMENTS

| | | |
|---|---|---|
| DE | 10 2004 001 505 A1 | 8/2005 |
| DE | 10 2012 109 123 A1 | 3/2014 |
| DE | 10 2018 108 360 A1 | 10/2019 |
| JP | 2009-247928 A | 10/2009 |
| JP | 2016-511352 A | 4/2016 |
| JP | 2018-202312 A | 12/2018 |
| KR | 10-2017-0133095 A | 12/2017 |
| WO | 2017/202985 A1 | 11/2017 |
| WO | 2018/066660 A1 | 4/2018 |
| WO | 2018/073077 A1 | 4/2018 |
| WO | 2018/073078 A1 | 4/2018 |
| WO | 2019/057542 A1 | 3/2019 |

OTHER PUBLICATIONS

International Search Report issued in PCT/EP2020/070975; mailed Oct. 13, 2020.

* cited by examiner

DOSING SYSTEM HAVING AN ADJUSTABLE ACTUATOR

The invention relates to a dosing system for a dosing substance, which dosing system comprises a housing having a nozzle and a feed channel for dosing substance, a discharge element arranged in the housing for discharging dosing substance from the nozzle, at least one first actuator, preferably a piezo actuator, coupled to the discharge element and/or the nozzle, and at least one second actuator, preferably an expansion material element, coupled to the first actuator. The invention further relates to a method for operating such a dosing system.

Dosing systems of the type mentioned at the beginning are typically used to apply a medium to be dosed in a targeted manner, that is, at the right time, at the right place and in a precisely dosed amount, onto a target surface. This can be done, for example, by dispensing a dosing substance drop by drop via a nozzle of the dosing system. In the context of so-called "microdosing technology", it is often necessary for very small amounts of the dosing substance to be placed on the target surface with pinpoint accuracy and without contact, that is, without direct contact between the dosing system and the target surface. A typical example of this is the dosing of glue dots, soldering pastes, etc. when assembling circuit boards or other electronic elements, or the application of converter materials for LEDs.

Such a contactless process is often referred to as a "jet process". A dosing valve that works according to the jet process is usually referred to as a "jet valve" or "jetting valve". Correspondingly, a dosing system that has at least one such jet valve and possibly also further components can be referred to as a "jetting dosing system". To dispense the medium from a jetting dosing system or jet valve, a movable discharge element can be arranged in the nozzle of the dosing system, for example, a plunger. To discharge dosing substance, the discharge element inside the nozzle can be pushed forward in a discharge direction at relatively high speed in the direction of a nozzle opening, whereby a single drop of the medium is discharged from the nozzle. This process is generally referred to below as the discharge process. The discharge element can then be withdrawn again in an opposite retraction direction. The size of the droplets or the amount of medium per droplet can be determined as precisely as possible in advance by means of the structure and activation and the effect of the nozzle achieved thereby.

Characteristically, and preferably also within the scope of the present invention, in a jetting dosing system or a jet valve, the dosing substance is "actively" discharged from the nozzle by a (discharge) movement of the discharge element relative to the nozzle. During the discharge process, a discharge tip of the discharge element particularly comes into contact with the dosing substance to be dispensed and "presses" or "pushes" the dosing substance out of the nozzle of the dosing system due to the (discharge) movement of the discharge element and/or the nozzle. In this way, a jetting dosing system differs from other dispenser systems in which a movement of a closure element only leads to an opening of the nozzle, wherein a dosing substance under pressure then exits the nozzle by itself. This is, for example, the case with injection valves of internal combustion engines.

Alternatively or additionally to the movable discharge element, the nozzle of the dosing system, for example, the nozzle of a jet valve itself can be moved in a discharge or retraction direction to dispense dosing substance. To dispense the dosing substance, the nozzle and a discharge element arranged inside the nozzle can be moved towards or away from one another in a relative movement, wherein the relative movement can take place either solely through a movement of the nozzle or at least partially also through a corresponding movement of the discharge element.

A constant relative movement between the discharge element and the nozzle is required in order to operate the dosing system, for example, in a jetting dosing system to achieve the highest possible dosing accuracy. The amount of dosing substance that is dispensed from the nozzle during a respective discharge process depends particularly on a (hydraulically) effective stroke of the discharge element and/or the nozzle, that is, for example, of a distance which the discharge element travels with a respective discharge movement in relation to the nozzle.

The smaller the (hydraulically) effective stroke of a dosing system, the more important it is to arrange the discharge element and the nozzle as precisely as possible in relation to one another in the dosing system. Especially with piezoelectrically operated dosing systems, the effective stroke of the discharge element and/or the nozzle is comparatively small, for example, compared to dosing systems having pneumatic actuators. For this reason, one of the most important tasks in dosing systems having piezo actuators, particularly, is the precise setting up of the overall system, that is, setting the position between the discharge element and the nozzle.

Piezoelectrically operated dosing systems can be set up or adjusted for the first time before delivery to a customer. For example, the piezo actuator and the discharge element and any further components can be arranged and adjusted in the dosing system at the factory such that a certain relative movement of the discharge element with respect to the nozzle takes place by means of a deflection of the piezo actuator in order to discharge a desired amount of dosing substance during the discharge movement.

It has been shown, however, that this one-off adjustment of the dosing system is often not sufficient to achieve a consistently high level of dosing accuracy even in continuous operation of the dosing system. Depending on the operating situation of the dosing system, there may therefore, under certain circumstances, be considerable deviations between a desired target amount and an actual amount of dosing substance discharged.

On the one hand, this can be due to the fact that the frequency of dispensing dosing substance, that is, the actuator frequency, can fluctuate greatly depending on the dosing requirement during operation. The different load situations of the actuator can lead to different power losses, particularly in the case of piezo actuators, wherein the respective temperature of the piezo actuator can fluctuate. This can further lead to a thermal elongation of the piezo actuator and possibly further components of the dosing system. The thermal longitudinal expansion of the piezo actuator can also undesirably change the (hydraulically) effective stroke of the discharge element and thus influence the dosing accuracy due to a coupling between the piezo actuator and the discharge element.

On the other hand, the movable components of the dosing system can be subject to wear and tear during operation. For example, due to frequent contact with the nozzle, a discharge tip of the discharge element can wear out at least in some regions such that a desired (hydraulically) effective stroke of the discharge element is no longer reliably achieved. This can also change the amount of dosing substance dispensed in each case.

Furthermore, it may be necessary to replace worn components of the dosing system from time to time, for example, a worn discharge element. Even after the replacement, it is necessary to readjust the dosing system in order to achieve a high level of dosing accuracy. This relatively complex process can often not be carried out with the necessary precision by a user of the dosing system, so that undesired changes in the required dosing process can occur.

However, as mentioned at the beginning, a highly precise dispensing of dosing substance is desired, especially in microdosing technology. It is therefore an object of the present invention to reduce the adverse effects described above.

This object is achieved by a dosing system according to patent claim 1 and by a method for controlling such a dosing system according to patent claim 7.

A dosing system according to the invention for a liquid to viscous dosing substance comprises a housing, wherein the housing has a nozzle having a nozzle opening and a feed channel for feeding dosing substance into the nozzle. A discharge element for discharging the dosing substance from the nozzle and at least one first actuator coupled to the discharge element and/or the nozzle are arranged in the housing of the dosing system. The first actuator can preferably be a piezo actuator, particularly a controllable piezo stack, even if, in principle, other types of actuators are also conceivable. The first actuator can particularly preferably be an encapsulated piezo stack hermetically sealed in an actuator housing. In the following, for the sake of better understanding, the invention is explained using a piezoelectrically operated dosing system, without being limited thereto, that is, that the first actuator is a piezo actuator.

The dispensing of the dosing substance from the dosing system according to the invention can take place according to one of the principles explained at the beginning. Correspondingly, as is usually the case, a discharge element movable at relatively high speed for discharging the dosing substance from the nozzle can be arranged in the nozzle of the dosing system (particularly in the region of the nozzle, for example, shortly before an outlet opening). Alternatively or additionally, the outlet opening, thus, for example, the nozzle of the dosing system, can be designed to be movable. In the following, it is assumed that the dosing substance is dispensed by means of a movable discharge element, as is preferred, for example, with a plunger. However, the invention is not intended to be limited thereto.

The dosing system according to the invention can particularly preferably operate according to the "jet process". Particularly, the dosing system can therefore comprise at least one jet valve. Reference is made to the definition given at the beginning in this regard.

The first actuator of the dosing system is functionally coupled at least at times to the discharge element or the nozzle. The coupling takes place such that the forces and movements exerted by the first actuator are passed on to the discharge element (or the nozzle) such that a desired, preferably vertical, movement of the discharge element and/or the nozzle for dispensing the dosing substance from the nozzle results therefrom. The first actuator can act on the discharge element directly, that is, without further movement-imparting components. However, it is preferred that the dosing system comprises a movement mechanism in order to transmit a deflection of the first actuator over a certain distance (that is, indirectly) to the discharge element. This will be explained later.

According to the invention, at least one further second actuator is located in the housing of the dosing system, which second actuator is coupled to the first actuator, particularly to the piezo actuator. The second actuator is designed to set a position of the first actuator, for example, the piezo stack encapsulated in an actuator housing, relative to the housing, particularly with respect to the discharge element and/or the nozzle. The first actuator and the second actuator can be activated separately for this purpose. The second actuator can therefore also be referred to as a positioning actuator for positioning the first actuator coupled to the discharge element and/or the nozzle. The coupling can take place such that the positioning actuator only lies against and/or bears on the first actuator. This means that the positioning actuator is in operative contact with the first actuator, wherein, however, a fixed connection between the two components is not absolutely necessary. The positioning actuator can, in principle, be any type of actuator, for example, a controllable piezo actuator, for example, again a piezo stack encapsulated in its own actuator housing, a shape memory actuator, a magnetostrictive actuator or the like. The second actuator is preferably a different type of actuator than the first actuator, since the second actuator basically does not have to work at such high expansion speeds as the first actuator.

The positioning actuator can preferably comprise at least one expansion material element. The second actuator can particularly preferably be implemented by means of an expansion material element. Correspondingly, the expansion material element can be designed to set a position of the at least one first actuator relative to the housing, particularly in relation to the discharge element and/or the nozzle. The advantage of such an expansion material element is a better ratio between the overall height (and also the volume) and the usable maximum stroke with comparable operational forces. The invention is described below, without being restricted thereto, on the basis of a second actuator implemented by means of an expansion material element. That is, unless otherwise mentioned, the first actuator (for moving the plunger and/or the nozzle) is only briefly referred to as an "actuator" or "piezo actuator" in the context of the application, wherein the second (positioning) actuator is referred to as "expansion material element" without loss of generality.

An expansion material element or expansion material working element, according to the general definition, is understood to be an expansion material having, for example, filled with an expansion material, actively expandable element, which can also be referred to as a "thermal expansion actuator". The expansion material element can comprise further components in addition to the expansion material, for example, a housing enclosing the expansion material and a working piston, as will be explained later. As is generally customary, the expansion material is preferably designed such that a change in temperature of the expansion material leads to a change in volume of the expansion material. A specific or directed movement (a stroke) can be generated by means of a corresponding design of the expansion material element via the change in volume of the expansion material. The extent of the movement generated (as usual) can be roughly proportional to the change in volume of the expansion material.

In order to generate a certain stroke by means of the expansion material element, the expansion material element can be controlled and/or regulated via a control unit of the dosing system. A temperature of the expansion material element is particularly controlled and/or regulated within the scope of the invention to control and/or regulate the expansion material element. Further details on the expansion material element and the control unit will be given at a later time.

According to the invention, the expansion material element is designed for this purpose and is arranged in the dosing system such that a certain position of the (first) actuator can be set relative to the housing of the dosing system. This means that a desired spatial arrangement of the actuator, particularly the piezo actuator, within the housing can be achieved by means of the expansion material element. Particularly, the position of the actuator in the housing can be actively changed by means of the expansion material element during operation, for example, during a respective discharge movement and/or a respective retraction movement of the discharge element. In other words, the actuator can be moved in the housing by the expansion material element, at least to a small extent.

The expansion material element is accordingly arranged in the dosing system such that the stroke generated by means of the expansion material element can predominantly be completely transferred to the actuator, particularly the piezo actuator, and can be used for positioning the actuator.

The expansion material element is designed particularly and arranged in the dosing system in order to set the position of the (first) actuator, particularly the piezo actuator, in relation to the discharge element and/or the nozzle of the dosing system. Particularly preferably, a position of a pressure piece of the actuator, which pressure piece transfers the forces generated by the actuator (directly or indirectly) to the discharge element and/or the nozzle, can be set and/or changed in relation to the discharge element and/or the nozzle by means of the expansion material element. For example, depending on the specific structure of the dosing system, a certain distance between the pressure piece of the actuator and a nozzle opening of the nozzle can be set by means of the expansion material element. A distance between the pressure piece of the actuator and the discharge element can also be set in the same way.

Advantageously, a specific target arrangement between the (first) actuator and the discharge element or the nozzle can be set by means of the expansion material element, such that an exact amount of dosing substance is discharged from the nozzle by a respective deflection of the actuator. The dosing system according to the invention thus comprises, with the expansion material element, an additional actuator for "pin-point precise" positioning of the actuator in the housing, such that, for example, the high dynamics of the piezo actuator can be used almost completely for the actual dosing function of the dosing system.

A particular advantage is that such a target arrangement or target position of the actuator can be kept predominantly constant even when the dosing system is in operation. On the one hand, the expansion material element can be used to fulfill thermal compensation functions, which is also referred to as "thermal compensation". For example, thermal changes in length of the actuator, particularly the piezo actuator, that occur during operation can be compensated for by operating the expansion material element in the opposite direction, such that a position of the actuator relative to the discharge element and/or the nozzle can be kept constant during operation.

On the other hand, the expansion material element can also fulfill mechanical compensation functions, for example, to compensate for operational wear of components of the dosing system. For example, the actuator, particularly the piezo actuator, can be routinely (re)positioned in the housing by means of the expansion material element during operation such that the target arrangement remains largely constant during operation despite signs of wear and tear on particularly moving components (such as the discharge element).

The expansion material element can also advantageously be used to (re)set the entire system correctly after a temporary interruption of the dosing operation. This makes it, for example, possible, if necessary, for only one worn component of the dosing system needing to be replaced, for example, a plunger instead of a fitted assembly. The target arrangement can then be restored by means of the expansion material element. The wear-related costs can therefore be reduced compared to known dosing systems using the dosing system according to the invention.

The dosing accuracy in the dosing system according to the invention can be considerably improved compared to known dosing systems due to the advantageous effects explained above.

In a method according to the invention for controlling a dosing system for a liquid to viscous dosing substance, the dosing system comprises a housing, wherein the housing has a nozzle and a feed channel for dosing substance. The dosing system further comprises a discharge element arranged in the housing for discharging dosing substance from the nozzle, at least one first actuator, preferably a piezo actuator, coupled to the discharge element and/or the nozzle, and at least one second actuator, preferably an expansion material element, coupled to the first actuator. The second actuator is controlled and/or regulated by means of a control unit such that a position of the at least one first actuator is set relative to the housing, particularly in relation to the discharge element and/or the nozzle.

An expansion length or expansion of the expansion material element can be controlled and/or regulated in at least one direction to position the (first) actuator in the housing. The expansion length of the expansion material element can particularly preferably be controlled and/or regulated via the temperature of the expansion material element. This will be explained in detail later.

Furthermore, particularly advantageous configurations and developments of the invention emerge from the dependent claims and the following description, wherein the independent claims of one claim category can also be further developed analogously to the dependent claims and embodiments of another claim category and particularly also individual features of various embodiments or variants can be combined into new embodiments or variants.

The second actuator, particularly the expansion material element, is preferably designed and arranged in the housing in order to set a position of the discharge element in relation to the nozzle of the dosing system via the position of the (first) actuator, particularly the piezo actuator. Particularly, a distance between a discharge tip of the discharge element and a nozzle opening of the nozzle can be set by means of the expansion material element via the position of the (first) actuator.

In a corresponding method for controlling the dosing system, the second actuator, particularly the expansion material element, can therefore be controlled and/or regulated such that a position of the discharge element is set in relation to the nozzle of the dosing system. The expansion material element can preferably be controlled and/or regulated such that a certain distance between the discharge tip of the discharge element and the nozzle opening of the nozzle is set via the position of the (first) actuator, particularly the piezo actuator.

In a preferred method for controlling the dosing system, the control and/or regulation of the second actuator, particularly the expansion material element, can take place such that a temperature of the second actuator, preferably the expansion material element, particularly a temperature of the expansion material, is controlled and/or regulated. For this purpose, at least one heating device associated with the expansion material element and/or at least one cooling device associated with the expansion material element can preferably be controlled and/or regulated, as will be explained later. Particularly preferably, a temperature of the expansion material element can be set such that a certain stroke of the expansion material element is generated in order to arrange the actuator, particularly the piezo actuator, and/or the discharge element in a certain position in the housing.

As mentioned, the discharge element can preferably be coupled to the (first) actuator, particularly to the piezo actuator, by means of a movement mechanism. The discharge element is also referred to synonymously as the plunger. The invention is described below, without being restricted thereto, on the basis of a dosing system having a movement mechanism. The movement mechanism can comprise a coupling element in order to transmit the movements of the actuator to the discharge element. The coupling between the actuator or the piezo actuator, particularly its pressure piece, and the movement mechanism and/or between the movement mechanism and the discharge element is preferably not a fixed coupling, that is, the respective components are preferably not screwed, welded, glued, etc. to one another for coupling.

Particularly preferably, the coupling element can have a transmission element, for example, a lever system having a tiltably mounted lever or the like to increase a deflection of the actuator by a certain factor. Particularly, the transmission element can be designed to generate a specific transmission ratio between a deflection or a stroke of the actuator and a movement or a stroke of the plunger resulting therefrom. On the one hand, this means that a deflection of the (first) actuator can be translated into a specific, desired stroke of the plunger by means of the transmission element.

On the other hand, the transmission element can advantageously also be used to transfer a change in position of the (first) actuator, preferably caused by the expansion material element, to the discharge element to a greater extent. This means that a relatively large change in position of the discharge element can be brought about by means of a comparatively small change in position of the actuator through the expansion material element.

The second actuator, particularly the expansion material element, is preferably designed and arranged in the housing in order to move the discharge element into a suitably defined "adjust position" of the discharge element during a defined operating state of the dosing system. The operating state preferably corresponds to the greatest possible deflection of the (first) actuator, particularly of the piezo actuator, provided during operation. A change in position of the (first) actuator can preferably be transmitted to the discharge element by means of the movement mechanism to set the "adjust position".

The "adjust position" is preferably characterized or defined here in that the discharge element, particularly the discharge tip of the plunger, is pressed into the nozzle with a certain force. The force exerted by the plunger on the nozzle in the adjust position is referred to as the push-in force or the sealing force. In the adjust position, the plunger can be pressed into a sealing seat of the nozzle such that a sealing region of the nozzle is preferably completely filled by the plunger. The sealing region is understood to be a region in the sealing seat of the nozzle which is directly adjacent to the nozzle opening inside the nozzle (nozzle chamber). The plunger and the nozzle can interact in a sealing manner in the sealing region, particularly by pressing the plunger against the sealing seat.

The plunger preferably builds up a certain sealing force with respect to the nozzle in the adjust position. For example, the sealing force of the discharge element can be at least 1 mN, preferably at least 1 N, more preferably at least 10 N.

In a preferred method for controlling the dosing system, the second actuator, particularly the expansion material element, can therefore be controlled and/or regulated such that the discharge element is brought into the adjust position of the discharge element during the defined operating state of the dosing system. The expansion material element can preferably be controlled and/or regulated such that the discharge tip of the discharge element is pressed against the nozzle with a maximum deflection of the piezo actuator with a certain sealing force that is provided during operation.

A "(hydraulically) effective stroke" of the plunger can advantageously be precisely set and maintained via the adjust position of the discharge element, wherein the dosing accuracy of the dosing system can be further improved. This is explained below.

In a preferred method for controlling the dosing system, the deflection of the (first) actuator (actuator deflection), particularly the electrical control voltage applied to the piezo actuator, can be used during a respective discharge process to move the plunger from a discharge start position until it reaches a "full contact" in the direction of the nozzle. The full contact is defined by the fact that the discharge tip of the plunger comes into operative contact with the nozzle, preferably completely circumferentially. Particularly, when there is full contact, the plunger can rest against the sealing seat of the nozzle such that the nozzle opening is closed.

The stroke movement (the distance covered) that the plunger executes during each discharge process up to full contact in relation to the nozzle is referred to as the "(hydraulically) effective stroke" of the plunger. The (hydraulically) effective stroke is therefore a portion of a maximum actuator deflection provided during operation or a portion of a maximum electrical control voltage applied to the piezo actuator during operation, which can be used for discharging the dosing substance and therefore has an influence on the dispensing of dosing substance.

On the other hand, the actuator deflection can also be used, at least in part, to push the plunger further in the direction of the nozzle beyond full contact. This defined portion of the total actuator deflection or the portion of the maximum provided electrical control voltage of the piezo actuator by which the plunger is pushed a certain minimum further in the direction of the nozzle starting from full contact is referred to as the sealing position actuator deflection, as will be explained later. A certain sealing force of the plunger can preferably be built up by means of the sealing position actuator deflection.

In an "ideal" very rigid dosing system, a position of the plunger after full contact can remain largely constant in the event of a progressive actuator deflection or a further increase in the electrical control voltage applied to the piezo actuator (piezo actuator control voltage). That is, the plunger is pressed against the nozzle with an increasing force by means of the sealing position actuator deflection, wherein a certain sealing force of the plunger can be built up.

Depending on the configuration of the dosing system, for example, depending on the nature of the materials used, the sealing position actuator deflection can also lead, however, to a slight elastic deformation of components of the dosing system. For example, the nozzle insert, the plunger, connecting elements of the fluidic unit such as the lever, or a combination of these or further components can be elastically deformed. Correspondingly, with an "ideal" dosing system that is not completely rigid, a position of the plunger can still change slightly after full contact due to the progressive actuator deflection or the increase in the piezo actuator control voltage, particularly in the nano or micrometer range. However, even with such a non-rigid dosing system, a large part of the sealing position actuator deflection can preferably be transferred to the plunger and used to set a sealing force of the plunger.

Regardless of the specific configuration of the dosing system, a maximum deflection of the actuator that is provided during operation, particularly a maximum control voltage applied to the piezo actuator during operation, can be "distributed" proportionally between a (hydraulically) effective stroke of the plunger on the one hand and the build-up of a sealing force of the plunger on the other, particularly by means of a corresponding activation of the expansion material element.

The adjust position of the plunger can advantageously be set through an interaction of the expansion material element and (first) actuator such that the plunger exerts a certain sealing force on the nozzle in the adjust position. The following applies: the greater the sealing force of the plunger in the adjust position, the greater the proportion of the sealing position actuator deflection required therefor in the maximum actuator deflection provided during operation or in the maximum intended piezo actuator control voltage. The portion of the actuator deflection or the piezo actuator control voltage that can be used for the (hydraulically) effective stroke of the plunger will correspondingly decrease. The (hydraulically) effective stroke of the plunger can therefore be set precisely by setting the adjust position of the plunger, particularly by setting the sealing force. A further improved dosing accuracy can thereby be advantageously achieved.

In order to be able to move the discharge element into the adjust position, the dosing system, as mentioned, preferably comprises at least one heating device associated with the second actuator, particularly the expansion material element, and/or at least one cooling device associated with the second actuator, particularly the expansion material element. The dosing system particularly preferably further comprises a control unit for controlling and/or regulating the heating device and/or the cooling device.

The heating device can preferably use electrical energy to heat the expansion material or the expansion material element. For example, at least one resistance heating element in the form of a heating foil could be arranged on an outer surface (outside) of the expansion material element, for example, on a housing of the expansion material element. Alternatively or additionally, at least one resistance heating element could be arranged in the expansion material itself. The heating device is preferably designed to uniformly heat the entire expansion material of the expansion material element to a specific target temperature.

The cooling device can preferably comprise at least one gaseous and/or liquid fluid for cooling the expansion material element or the expansion material. A cooling medium can preferably be applied to the outside of the expansion material element at least in some regions, for example, in that a housing of the expansion material element is directly flown or blown with cooling medium. For this purpose, the cooling device in the dosing system can comprise a cavity (cooling region) which surrounds the expansion material element and can be flooded with cooling medium. Furthermore, the cooling device can comprise flow-directing elements in order to specifically apply cooling fluid to individual subregions of the expansion material element. However, essentially the entire outside of the expansion material element can also be actively cooled. The cooling device can furthermore comprise supply and discharge devices in order to introduce the cooling medium into the dosing system, particularly into the cooling region, or to remove it again therefrom.

The cooling medium is preferably designed to be able to cool the expansion material element to a certain temperature value as quickly as possible. This temperature value can also be above room temperature and/or above a "parasitic" heating of the expansion material element by the piezoelectric actuator. However, such a temperature value is preferably below 45° C., more preferably below 30° C., particularly preferably below 18° C.

Air, particularly compressed air, can also be used as the cooling medium at least in those cases in which the temperature value is above room temperature. Uncooled compressed room air has the advantage that it can be provided comparatively inexpensively and at a sufficiently large volume flow.

Alternatively, cooled air, particularly cooled compressed air, can also be used as the cooling medium. For example, the cooling medium can be "actively" cooled to a certain target temperature by means of a cold source associated with the cooling device, for example, a refrigeration machine and/or a vortex tube. The cooling medium could then be designed to cool the expansion material element to a temperature below an ambient temperature of the dosing system.

The cooling capacity of the cooling device associated with the expansion material element can preferably be controlled and/or regulated separately. An ability to separately activate is particularly useful when the cooling device of the dosing system is also provided for temperature control of other components of the dosing system. For example, the cooling device could also be designed to control the temperature of the actuator, particularly the piezo actuator, in order to cool it down to a working temperature during operation. In this case, the cooling device associated with the expansion material element can be designed as a separate sub-cooling device of a jointly used total-cooling device of the dosing system. A further sub-cooling device can correspondingly be associated with the actuator. The total-cooling device can then preferably comprise two separately controllable proportional valves in order to individually supply the expansion material element or the actuator with cooling fluid.

The cooling device associated with the expansion material element and the heating device are preferably designed to be separately activatable. As a result, a thermal decoupling of the expansion material element from other components of the dosing system can be achieved to the greatest possible extent. Particularly preferably, the cooling device and the heating device can also be operated simultaneously. As a result, a certain target temperature of the expansion material element can be set in a particularly time-efficient manner, and an overshooting of the temperature can be prevented. In addition, a slight, controlled "working against one another" of the heating device and cooling device can contribute to increased "rigidity" or constancy of the temperature of the expansion material element, for example, against external interference.

The dosing system preferably comprises at least one control or regulating unit to control and/or regulate the heating device and/or the cooling device. The dosing system can, on the one hand, be coupled to an external control or regulating unit, for example, a central control unit for the separate activation of a plurality of dosing systems. Such a central control or regulating unit could be implemented as software to the greatest possible extent, preferably in the form of a computer unit using suitable software. The computer unit can, for example, have one or more cooperating microprocessors or the like.

However, the dosing system can also be associated with a separate "dosing system-specific" control unit. This can, for example, be implemented by means of a circuit board inside the housing. On the one hand, the "dosing system-specific" control unit can be designed to independently control the entire dosing process. A central control or regulation unit could then be dispensed with.

On the other hand, the "dosing system-specific" control unit can also be designed to control only individual processes of the dosing process. The "dosing system-specific" control unit can then preferably be designed as a sub-control unit of a central control unit and coupled thereto for signaling purposes. For example, the "dosing system-specific" control unit can be provided for controlling and/or regulating the second actuator, particularly the expansion material element, that is, particularly for performing adjustment processes and for thermal and/or mechanical compensation functions. In contrast, the central control unit can control the remaining processes of the dosing process, for example, the electrical wiring of the piezo actuator. In the following, a "dosing system-specific" control unit according to the second variant is described without being restricted thereto. The control unit can also comprise a plurality of sub-control units, which can then jointly form the control unit.

The term control is used in the context of the application as a synonym for control and/or regulation. This means that even when one speaks of a controller, the controller can comprise at least one regulating process. In the case of regulation, a regulated variable (as an actual value) is generally captured continuously and compared with a reference variable (as a target value). The regulation is usually carried out such that the regulated variable is matched to the reference variable. This means that the regulated variable (actual value) continuously influences itself in the action path of the control loop.

In a preferred method for controlling the dosing system, a number of operating parameters of the dosing system can be taken into account when controlling and/or regulating the second actuator, preferably for controlling and/or regulating the expansion material element, preferably for setting the temperature of the expansion material element. At least one of the following operating parameters can be taken into account particularly for setting, that is, for determining and/or reaching, the adjust position:

A first operating parameter can be a temperature of the second actuator, particularly a temperature of the expansion material element, particularly preferably a temperature of the expansion material or an expansion body of the expansion material element. The expansion body and the expansion material element will be explained in more detail later. A temperature of the (first) actuator and/or a temperature of the housing in one or more different housing regions can also be taken into account as operating parameters.

The dosing system can comprise a sensor arrangement coupled to the control unit and having a number of sensors to determine the temperature and further operating parameters. The measured values of the respective sensors can be supplied to the control unit as (measurement) signals.

The sensor arrangement preferably comprises at least one temperature sensor associated with the second actuator, particularly the expansion material element, preferably for determining the temperature of the expansion material. Preferably, the dosing system can additionally comprise at least (each) one temperature sensor associated with the (first) actuator and/or one temperature sensor associated with the housing.

A further operating parameter that can be included in the control of the expansion material element is the position of the discharge element in the dosing system. The position of the discharge element can preferably be determined via a position of a lever coupled to the discharge element (as part of the movement mechanism).

To capture this operating parameter, the sensor arrangement preferably comprises at least one position sensor for determining a position of the discharge element. Such a position sensor can, for example, be implemented by means of a Hall sensor. A movement of the plunger can preferably also be calculated by means of the (measurement) signals of the Hall sensor. Alternatively or additionally, the sensor arrangement can comprise at least one movement sensor for determining a movement of the discharge element. A motion sensor can, for example, be implemented by means of an acceleration sensor. A movement or position of the plunger in relation to the position of the sensor can preferably be determined by means of the movement and/or position sensor.

Preferably, at least one thermally compensated Hall sensor can be arranged in a region of the housing such that the sensor can interact with a magnet in the region of the plunger and/or in the region of the lever in order to capture a stroke movement of the plunger (for example, a vertical distance measurement) with a respective discharge process and/or with a respective retraction movement. The Hall sensor can preferably be arranged on an imaginary vertical axis with the plunger (corresponding to its longitudinal extension). Preferably, measured data about the (hydraulically) effective stroke of the plunger can be obtained by means of the Hall sensor.

A further operating parameter can be an actuator position of the actuator, for example, a respective deflection of the actuator. An electrical control voltage applied to the piezo actuator can preferably be the operating parameter.

A further operating parameter can be an amount and/or a weight of dosing substance, which dosing substance is to be dispensed or should be dispensed during a respective discharge process from the nozzle of the dosing system. Such a measured value representing the amount and/or weight of dispensed dosing substance can be for example, be determined in a weighing process. Alternative or additionally, a "dosing volume-dependent" signal of the dispensed dosing substance can also be determined, for example, via an optical evaluation unit of the sensor arrangement. Preferably, a signal, for example, a measured value of a flow sensor for dosing substance can be used as an operating parameter. The measured value can, for example, be determined by means of a volume flow meter in the region of the nozzle opening.

A sealing force of the discharge element that is applied in the closed state of the dosing system can also represent a further operating parameter. The corresponding measured values can be obtained by means of a force sensor in the plunger or in the nozzle or, alternatively, by means of a force sensor for determining a bearing force of the first or the second actuator.

Calibration data of the dosing system can be used as further operating parameters, wherein the calibration data are preferably stored in the dosing system and are able to be read out by the respective control unit.

The calibration data can particularly normalize the Hall sensor and its signals and normalize a transfer function of an electrical control voltage of the piezo actuator in relation to a respective plunger position at an operating point, that is, in an adjusted state of the lever system.

Furthermore, calibration data can relate to different heating zones of the dosing system. For example, a first heating zone can be associated with a dosing substance cartridge, a second heating zone can be associated with the fluidic unit, for example, a feed channel, and a third heating zone can be associated with the nozzle, in order to control the temperature of the dosing substance in the respective heating zone, preferably differently.

In addition, calibration data can relate to a volume flow of a respective proportional valve in relation to an activation voltage of the proportional valve at a given pressure.

The expansion material element can advantageously be controlled such that at least the essential, preferably all, operating parameters of the dosing system that can have an influence on the plunger position and/or the (hydraulically) effective stroke of the plunger are taken into account. As a result, the expansion material element can be controlled in a targeted manner such that the adjust position of the discharge element can be set particularly reliably during operation. By calculating a plurality of operating parameters in the control, a less failure-prone or more robust activation can be achieved, wherein the dosing accuracy can be further improved.

In order to be able to determine and/or achieve the adjust position of the plunger as precisely as possible, an adjustment process (adjust process) having a multi-step regulation algorithm can preferably be run through. The individual steps of the regulation algorithm can preferably be processed by the control unit at least partially automatically, preferably fully automatically.

In a first step, a maximum deflection of the (first) actuator that is provided during operation of the dosing system can be set. A "closed position" of the dosing valve can therefore be set, wherein the discharge tip of the plunger is moved in the direction of the nozzle. Regular dispensing of the dosing substance from the nozzle is preferably not possible during the entire adjustment process, for example, by temporarily blocking a trigger to initiate the dispensing process.

An "adjustment start temperature" of the second actuator, particularly the expansion material element, particularly preferably the expansion material, can be set in a second step. This ensures that the discharge tip of the plunger is not (yet) in contact with the nozzle at this time, despite the already expanded actuator. The expansion material element can preferably be cooled for this purpose. The adjustment start temperature can correspond, for example, to an ambient temperature of the dosing system. The adjustment start temperature can preferably be below an expected (defined later) "adjust temperature".

In a further step, the second actuator, particularly the expansion material element, particularly preferably the expansion material, can be heated starting from the adjustment start temperature until there is full contact between the discharge tip of the plunger and the nozzle. This means that the expansion material element is expanded so far via the temperature that the plunger is pushed in the direction of the nozzle and finally makes contact therewith. As already mentioned, full contact is achieved when the discharge tip of the plunger rests essentially over the entire circumference of the sealing seat of the nozzle, wherein the nozzle opening is sealed in an annular manner.

In order to determine this point of full contact, an (adjustment) ratio between the respective temperature of the expansion material element and the corresponding position of the discharge element can preferably be determined during the heating of the expansion material element. This change in position of the plunger can preferably be determined in relation to the change in temperature by means of the control unit. For this purpose, the control unit can, for example, access the temperature sensor of the expansion material element and the position sensor of the lever, which is coupled to the plunger, and form or save corresponding "temperature-position" value pairs. Corresponding "temperature-position" value pairs can preferably be formed during the entire adjustment process. As previously explained, the position of the plunger can preferably be determined in relation to the Hall sensor, for example, a distance to the Hall sensor can be determined.

Until full contact is achieved, a predominantly linear (first) (adjustment) ratio is established between the temperature of the expansion material element and the respective plunger position ("ideal" dosing system). The (adjustment) ratio corresponds to, for example, a slope of a function graph based on the above-mentioned value pairs. After the "full contact point" has been reached, the plunger tip is pressed further against the sealing seat of the nozzle while the expansion material element is heated continuously.

In an "ideal" very rigid dosing system, a further expansion of the expansion material element essentially only leads to a build-up or an increase in the sealing force of the plunger with respect to the nozzle. Accordingly, the position of the plunger will no longer change or will no longer change measurably, wherein the temperature of the expansion material further rises. A new (second) predominantly linear (adjustment) ratio is therefore established, which preferably differs from the first (adjustment) ratio. The second (adjustment) ratio can preferably correspond to a slope which differs from the slope of the first (adjustment) ratio. In the "ideal" very rigid dosing system considered here, the slope of the second (adjustment) ratio would be approximately zero. The plunger position at which the transition from the first to the second (adjustment) ratio takes place corresponds to a full contact position of the plunger.

In an "ideal" non-rigid dosing system, further expansion of the expansion material element after full contact can lead to elastic deformation of components of the dosing system. The position of the plunger can accordingly change slightly after full contact. However, the change in position of the plunger in relation to the temperature rise of the expansion material element is preferably only very small, particularly less than before full contact. Therefore, even with an "ideal" non-rigid dosing system, a new (second) predominantly linear (adjustment) ratio is established. In such an "ideal" non-rigid dosing system, a slope associated with the second (adjustment) ratio can be significantly smaller or flatter than a slope associated with the first (adjustment) ratio. In contrast to an "ideal" very rigid dosing system, the second slope would of course not be approximately zero here. The plunger position at which the transition from the first to the second (adjustment) ratio takes place corresponds to the full contact position of the plunger.

In a "non-ideal" or "real" dosing system, it is possible for the discharge tip of the plunger to initially hit a conical sealing seat inside the nozzle on one side or only in certain regions. This can be, for example, the case when the plunger is not arranged exactly in the center of the nozzle or not in alignment with the nozzle opening. Such a contact, in which only a region or only part of the plunger tip comes into contact with the nozzle, is referred to as "initial contact" or "partial contact". Correspondingly, in a "real" dosing system, the heating of the expansion material element, starting from the adjustment start temperature, can initially lead to a partial contact, which is to be distinguished from a full contact.

A predominantly linear (first) (adjustment) ratio between the temperature of the expansion material element and the respective plunger position can be established up to partial contact.

As part of the adjustment process, the expansion material element can be heated further until the plunger finally "slips" into the nozzle due to the progressive expansion of the expansion material element, wherein the above-described full contact between plunger and nozzle is achieved. This process of "slipping into" the plunger into the nozzle is also known as the "shift process". Furthermore, "temperature-position" value pairs can preferably be formed, wherein the respective corresponding plunger position is associated with the respective temperature of the expansion material element.

Since the plunger is pressed into the full contact position after the initial contact against a certain resistance of the nozzle, the position of the plunger can change more slowly in relation to the temperature rise of the expansion material element than before the initial contact. A new (second) predominantly linear (adjustment) ratio is therefore established, which preferably differs from the first (adjustment) ratio. The plunger position at which the transition from the first to the second (adjustment) ratio takes place corresponds to an initial contact position of the plunger. The initial contact position of the discharge element can be determined and, optionally, stored in an optional step. This value, together with the full contact position, can provide information about the mechanical quality of the system and can therefore be helpful in the context of a system evaluation. Furthermore, an "initial contact temperature" of the expansion material element, that is, the temperature that the expansion material element has at the time of the initial contact, can be determined and possibly stored.

In a "real" dosing system, analogous to an "ideal" dosing system, full contact is defined by the fact that there is (again) a change in the (adjustment) ratio. The expansion material element can preferably be heated further after the initial contact until a new (third) (adjustment) ratio is established. The plunger position at which the change from the second to the third (adjustment) ratio takes place corresponds to the full contact position of the plunger in a "real" dosing system.

Depending on the specific design of the "real" dosing system, the position of the plunger after reaching full contact can remain essentially constant with continuous heating of the expansion material element (very rigid system) or change very slightly (non-rigid system), as previously explained for the respective "ideal" systems.

In a next step, the full contact position of the discharge element can then be determined and, optionally, stored. Furthermore, a "full contact temperature" of the expansion material element, that is, the temperature that the expansion material element has at the time of the full contact, can be determined and possibly stored.

In a further step of the adjustment process, an adjust position of the discharge element can then be determined and, optionally, stored, preferably on the basis of the previously determined "temperature/plunger position" value pairs. Furthermore, an "adjust temperature" of the expansion material element, that is, the temperature that the expansion material element has at the desired adjustment point, can be determined and, optionally, stored. As mentioned, the adjust position is an empirically determined value at which, for example, a sealing force that is just high enough is built up between the plunger and the nozzle to guarantee reliable sealing of the system during operation.

The adjust position and/or the adjust temperature can preferably be determined at least as a function of the full contact position of the discharge element and/or as a function of the full contact temperature of the expansion material element.

The adjust position of the discharge element can preferably be determined at least as a function of a full contact position of the plunger and a slope of an (adjustment) ratio, wherein the (adjustment) ratio results from a change in position of the plunger in relation to a change in temperature of the expansion material element, particularly until an initial contact is reached or until a full contact is achieved.

The adjust position of the discharge element can particularly preferably be calculated using the following equation:

$$s(AP)=s(VP)+m \cdot T(DS,FS,m) \qquad (1)$$

These are:
- s(AP)=position of the discharge element in the adjust position. A corresponding adjust temperature of the expansion material element is determined for this purpose, preferably on the basis of the previously captured "temperature-position" value pairs.
- s(VP)=position of the discharge element in full contact and a corresponding full contact temperature of the expansion unit determined therefrom.
- m=($\Delta s/\Delta T$)=slope of a function graph based on "plunger position-temperature" value pairs until an initial contact is reached ("real" system) or until a full contact is reached ("ideal system") (depending on which contact is reached first).
- T=required temperature difference of the expansion material element, based on full contact, in order to achieve a desired sealing force of the plunger. Preferably, a temperature difference value T as a function of a total spring stiffness FS of an actuator system, as a function of a desired sealing force DS, which, for example, can be stored in a firmware of the dosing system, and calculated depending on the slope m determined in each case. The total spring stiffness FS is understood to mean a type of mean spring stiffness of a dosing system, wherein the spring stiffness for example, can be measured on several copies of the dosing system and, optionally, averaged over several copies.

In addition, the adjust position can be dependent on an application-specific parameter that is included in the determination process. For example, it may be advantageous, when the supply pressure of the medium to be dosed is particularly high, the forces acting on the plunger can be compensated for by an initially higher sealing force and thus the supply pressure included as an application-specific parameter.

In the case of a very rigid dosing system, the respective position of the plunger should essentially no longer change after full contact. Therefore, s(AP) is essentially equal to s(VP), wherein the difference due to the term m·T does not lead to a further change in position, but only to a required build-up of sealing force by the plunger.

The position of the plunger in the adjust position can therefore preferably be essentially the same as the position of the plunger in the full contact position and/or essentially the same as the position of the plunger in a discharge end position, which will be explained in more detail later.

In a dosing system that is not completely rigid, the specific total spring stiffness FS can be taken into account when determining s(AP) by the term m·T, such that an elastic deformation can be compensated for and a desired sealing force can be built up in the adjust position. In a non-rigid dosing system, too, the position of the plunger in the adjust position can preferably be essentially the same as the position of the plunger in the discharge end position. The position of the plunger in the adjust position can preferably correspond approximately to the position of the plunger in the full contact position.

In summary, the adjust position of the plunger for setting a desired sealing force can preferably be determined at least taking into account a (previously determined) full contact position of the plunger, a (first) slope (via the temperature) of the still freely movable plunger and a total spring stiffness of the dosing system stored in the system. Alternatively, a desired sealing force (adjust force) and thus also an adjust temperature could be regulated directly by means of a force sensor (which will be explained later).

The adjust position s(AP) of the discharge element can preferably be set via the expansion material element. Particularly preferably, an adjust temperature can be set in the expansion material element in order to bring the discharge element into the adjust position. Therefore, in a last optional step of the adjustment process, the discharge element can be brought into the adjust position, preferably by appropriately temperature control of the expansion material element to the temperature determined for the adjustment point. For this purpose, the expansion material element can preferably be heated further beyond the full contact temperature until the adjust position of the discharge element is reached.

Reaching or setting the respective adjust position depends on the specific configuration of the dosing system, as will be explained below.

The full contact can already correspond to the adjust position of the plunger in an "ideal" very rigid dosing system. As explained above, a heating of expansion material element above the full contact temperature leads to a sealing force of the plunger being built up. The position of the plunger, however, remains essentially constant. The full contact position of the plunger can therefore preferably correspond to the adjust position of the plunger.

In an "ideal" non-rigid, that is, at least partially elastic, dosing system, as mentioned, the position of the plunger can change slightly due to an elastic deformation of components of the dosing system after the full contact. A (second) predominantly linear (adjustment) ratio can therefore be established from the full contact, which preferably only has a very slight slope. The adjust position is reached when the desired sealing force is achieved.

For a "real" dosing system, a change from a second to a third (adjustment) ratio only defines the full contact position of the plunger. Correspondingly, in a very rigid "real" dosing system, the plunger position at which the transition from the second to the third (adjustment) ratio takes place can correspond to the adjust position of the plunger. A slope associated with the third (adjustment) ratio can then be approximately zero.

In contrast, in a non-rigid "real" dosing system, the plunger can still be moved slightly into the adjust position according to a third (adjustment) ratio or according to an associated third slope, wherein after the adjust position has been reached, the position is no longer changed, since the expansion material element is not expanded any further.

As already explained, in a non-rigid dosing system, the plunger can still be moved slightly after the full contact, wherein here also, a large part of the further expansion of the expansion material element can be used to set a sealing force of the plunger after the full contact.

Alternatively or additionally, it can also be provided in the adjustment process that the second actuator, particularly the expansion material element, is heated beyond the full contact temperature until a maximum "system deflection" is reached during operation. The maximum "system deflection" corresponds to a maximum deflection of the (first) actuator provided during operation and a maximum provided expansion of the expansion material element during operation.

Correspondingly, a "system end contact" position of the discharge element can then be determined and, optionally, stored in the adjust process, that is, the position that the discharge element has when the system deflects at its maximum during operation. Furthermore, a "system end contact" temperature of the expansion material element can be determined and, optionally, stored, that is, the temperature that the expansion material element has at the maximum system deflection provided during operation. The "system end contact" position or the "system end contact" temperature can preferably also be determined on the basis of "temperature-plunger position" value pairs.

The thus determined "system end contact" position of the discharge element and/or the "system end contact" temperature of the expansion material element can be taken into account alternatively or additionally to the full contact position or the full contact temperature when determining the adjust position and/or the adjust temperature.

In order to bring the discharge element from the "system end contact" position into the specific adjust position, the expansion material element can optionally also be brought to the adjust temperature associated with the adjust position, preferably by means of cooling.

Furthermore, the "system end contact" position defined in this way also represents a measure of a maximum control range during operation. The greatest possible sealing force can be achieved during operation in the "system end contact" position. Advantageously, a difference between a certain adjust position and the "system end contact" position can be used to obtain information about a control reserve and thus possibly also about the existing wear of the dosing system.

On the one hand, the adjustment process described above can be performed before the first start-up of the dosing system, for example, to determine an initial adjust position. However, the adjustment process can also be performed (again) after a temporary interruption of the dosing operation, for example, after replacing a plunger. Routine adjustment of the dosing system is also conceivable.

A particularly precise and simultaneously uncomplicated setting of the adjust position of the plunger can advantageously be carried out by means of the expansion material element in the adjustment process. This process is also referred to as a "thermal adjust" by the expansion material element. Since the adjust position can be determined separately for each dosing system, any manufacturing tolerances of each individual dosing system can be compensated for by the control unit itself. As a result, an essentially identical (hydraulically) effective stroke can be set in dosing applications with a plurality of dosing systems, that is, the dosing systems can dose in a particularly comparable manner.

The adjustment process can further advantageously be performed in a comparatively uncomplicated manner. The dosing system can, for example, preferably be designed such that the adjustment process is started by means of an input to the control unit by a user, wherein the entire adjustment then runs automatically. On the one hand, the operating costs of the dosing system can be reduced in this way, since the adjustment can now also be carried out by the user himself, particularly also by untrained personnel. At the same time, however, the adjustment process is also highly reliable, since human intervention, and corresponding sources of error, can be largely avoided. The dosing accuracy of a respective dosing system and, above all, the comparability of the dosing of a plurality of dosing systems can be further improved in this way.

In order to be able to profitably use the previously explained advantages of the adjustment process during the dosing, the second actuator, particularly the expansion material element, is preferably controlled and/or regulated such that precisely a discharge end position of the discharge element during operation of the dosing system, particularly during each discharge process, corresponds to an adjust position determined in a previously performed adjustment process. The control and/or regulation of the expansion material element can preferably be determined as a function of an actual discharge end position of the plunger during a respective discharge process, taking into account a change in the piezo actuator control voltage during the same discharge process. The "discharge end position" is understood to mean the position of the plunger that the plunger actually has at the end of a respective discharge process, that is, at a maximum deflection of the (first) actuator provided during operation. The position of the plunger in the discharge end position can preferably be essentially the same as the position of the plunger in the adjust position.

A regulating process can preferably take place such that the discharge end position is regulated to a constant value during operation, particularly to the adjust position. For this purpose, the expansion material element can be regulated such that an adjust temperature, which, as mentioned, is associated with the previously determined adjust position, is reached and/or kept constant in the expansion material element. A PID controller or fuzzy controller coupled to the control unit can preferably activate the heating device and/or the cooling device of the expansion material element in such a way as to set the adjust temperature.

Advantageously, the regulation process can also be used to ensure that a desired (hydraulically) effective stroke of the plunger is reliably achieved during operation and can also be maintained constant over a longer time period.

However, setting or keeping the adjust temperature constant in the expansion material element can also be useful if there is temporarily no dispensing of dosing substance, for example, when the dosing system is temporarily in a standby mode (hold mode). The adjust temperature in the expansion material element can preferably be kept constant by means of the PID controller even when the dosing system is at a standstill. As a result, a high level of dosing accuracy can be guaranteed immediately even if the dosing process is resumed at short notice.

In order to ensure particularly stable operation of the dosing system, the dosing system can comprise at least one force sensor, which is preferably coupled to the control unit for signaling purposes. Measured values of the force sensor can preferably be taken into account when regulating the expansion material element.

The force sensor is preferably designed to determine a force exerted by the second actuator, particularly by the expansion material element, on the (first) (piezo) actuator. Particularly, the force sensor can also be designed to determine a sealing force of the plunger relative to the nozzle on the basis of the measured values of the force sensor, for example, with the aid of an evaluation unit (which can also be part of the control unit). The force sensor can preferably be arranged in a "line of force" with the expansion material element and the piezo actuator. For example, the force sensor can be arranged in a support point or contact point of the expansion material element opposite the piezo actuator.

Advantageously, the force sensor can be used to regulate directly to a constant force. Particularly, a sealing force of the plunger can be adjusted to be constant via the force sensor. Since the spring stiffness of the overall system should not change during operation, seamless regulation is then possible in all operating modes, for example, also in hold mode.

In order to improve the dosing accuracy even further, particularly under fluctuating operating or environmental conditions, a multi-step regulation algorithm can be run through in a preferred control method of the dosing system in order to regulate the discharge end position of the plunger particularly precisely to the desired adjust position previously determined, for example as described above, or indirectly to a specific sealing force. The individual steps of the regulation algorithm can preferably be processed by the control unit, particularly fully automatically. This correction algorithm can preferably be run through in the ongoing (regular) dosing operation.

The regulation algorithm can basically be run through during a respective "closing" gradient and/or during a respective "opening" gradient, that is, during a discharge process of dosing substance or during a retraction movement of the plunger. Depending on the dosing requirement, the "opening" gradients can be run at slightly slower speeds than the "closing" gradients, such that more value pairs can be captured at a given sampling rate for each "opening" gradient, wherein the evaluation can be even more precise. Therefore, the use of the "opening" gradient can even be preferred. For a better clarification of the regulation process, unless otherwise mentioned, the individual steps are described below based on a "closing" gradient, without being limited thereto.

In a first step, a discharge start position of the discharge element can be set. The discharge start position is characterized in that the (first) actuator is not deflected, that is, the (first) actuator is in a rest position. Accordingly, the discharge tip of the plunger is spaced as far from the nozzle as is possible during operation. The regulation algorithm therefore preferably starts as soon as a retraction movement of the plunger has been fully completed or immediately before a new discharge movement starts. The discharge start position, for example, can be determined via the Hall sensor and/or the electrical control voltage of the (first) actuator, particularly the piezo actuator.

In a second step, a deflection of the (first) actuator and/or a change in the electrical control voltage of the (first) actuator as a function of time can be captured during a single discharge process. A deflection speed of the (first) actuator can preferably be determined in this way, to be precise, starting from the rest position of the actuator up to the maximum deflection of the actuator (provided during operation). The change in the electrical control voltage applied to the (first) actuator, particularly to the piezo actuator, can preferably be captured over time (rate of change of the control voltage).

The plunger position can preferably also be captured as a function of time during the same discharge process. A plunger speed can preferably be determined in this way, to be precise, starting from the discharge start position up to the reaching of the discharge end position of the plunger. As mentioned, the plunger position can be captured via the Hall sensor.

The rate of change of the control voltage of the piezo actuator and thus the corresponding plunger speed are preferably determined repeatedly at essentially the same points in time. Preferably, value pairs ("control voltage-plunger position" value pairs) over the time of the discharge process can therefore preferably be captured regularly by means of the control unit, wherein the value pairs comprise the respective actuator control voltage (first actuator) and the corresponding (associated) plunger position.

In a further step of the regulation algorithm, an actual value of a value representing a sealing position actuator deflection can then be determined. As mentioned, the sealing position actuator deflection can be a proportion of the maximum deflection of the first actuator provided during operation. The sealing position actuator deflection can preferably be a portion of an electrical control voltage applied at most to the piezo actuator (as the first actuator) during operation. The sealing position actuator deflection is defined by the fact that the discharge element is pressed into the sealing seat of the nozzle by a certain minimum amount beyond the full contact between the discharge element and the nozzle. The sealing position actuator deflection is therefore specifically that portion of the actuator deflection that brings the plunger into the sealing region and thus builds up a desired sealing force.

A value that represents the sealing position actuator deflection can preferably be a component (a partial voltage) of the maximum electrical control voltage applied to the piezo actuator (as the first actuator) during operation in order to set a specific sealing force of the plunger. In a pneumatic actuator, for example, a gradual pressure build-up in relation to the respective corresponding plunger position can be captured. The sealing position actuator deflection could then correspond to a specific increase in pressure which, based on full contact, is still required to build up the sealing force.

This means that by determining the sealing position actuator deflection, particularly its extent, it can be determined whether the plunger is moved into a desired adjust position or whether the discharge movement ends at another discharge end position, for example, at an "earlier" or "later" point.

The determination of the value that represents the sealing position actuator deflection can preferably take place on the basis of the previously determined "control voltage-plunger position" value pairs. The rate of change of the control voltage of the piezo actuator (as the first actuator) can preferably be compared with the corresponding plunger speed, particularly over the entire discharge process. A ratio between the rate of change of the control voltage and the plunger speed can preferably be determined.

The rate of change of the electrical control voltage of the piezo actuator can be essentially constant during the entire discharge process. However, more complex activation voltage functions are also possible, that is, the control voltage can vary during the discharge process. In the case of a constant rate of change of the electrical control voltage of the piezo actuator, the deflection speed of the piezo actuator can vary during different phases of the discharge process. The two components form a "movement unit" due to the coupling between the (piezo) actuator and the discharge element, for example, by means of a lever. Correspondingly, the plunger speed can also be different during a respective discharge process, as will be explained below.

At the beginning of a respective discharge process, the deflection of the (piezo) actuator can initially move the plunger at a first, predominantly constant speed in the direction of the nozzle. A first (speed) ratio can therefore be established between the rate of change of the piezo actuator control voltage and the plunger speed.

In an "ideal" very rigid dosing system, the plunger speed can slow down considerably after full contact, particularly to zero, wherein the plunger is pressed further into the nozzle. For a piezo actuator, this means that the electrical control voltage increases essentially constantly, wherein the plunger no longer moves in a measurable manner. A longitudinal extension of the piezo actuator hardly changes any more due to the coupling of the piezo actuator and the plunger. This means that the increase in the electrical control voltage leads to a predominantly constant increase in pressure or to a (mechanical) build-up of tension in the piezo actuator, via which the sealing force of the plunger can then be built up.

After full contact, a second (speed) ratio can therefore be set between the rate of change of the control voltage and the plunger speed, which ratio preferably differs from the first ratio. The full contact position of the plunger is reached at the moment or at the plunger position at which the change from the first to the second (speed) ratio takes place. As already explained, in an "ideal" very rigid dosing system, the full contact position of the plunger can preferably be essentially the same as the discharge end position of the plunger, wherein a maximum control voltage provided during operation is applied to the piezo actuator.

In an "ideal" non-rigid dosing system, the plunger speed can also slow down significantly after full contact, wherein a second (speed) ratio is also established here. The plunger position at which the transition from the first to the second (speed) ratio takes place corresponds to the full contact position of the plunger. The second (speed) ratio here corresponds to a slight change in the position of the plunger due to an elastic deformation of components of the dosing system. The plunger can be moved slightly further until a maximum control voltage provided during operation is applied to the piezo actuator, wherein the discharge end position of the plunger is reached. This means that in the case of a non-rigid system, unlike a rigid system, after full contact, a small part of the electrical voltage change of the piezo actuator can still be converted into a change in travel of the plunger, wherein the major part flows into the change in force.

In a "real" dosing system, a first (speed) ratio can be established up to the initial contact, wherein the plunger speed can slow down after the initial contact due to the "shift process". The plunger position at which there is a change from the first to a second (speed) ratio then corresponds to the initial contact position of the plunger. As soon as the plunger has "slipped" into the full contact position due to the actuator deflection, the plunger speed can slow down significantly, wherein a third (speed) ratio is established. The plunger position at which a change from the second to the third (speed) ratio takes place then corresponds to the full contact position of the plunger.

Depending on the configuration of the dosing system, the full contact position can correspond to the discharge end position (rigid system). Otherwise, according to the third (speed) ratio, the plunger can still be moved into the discharge end position defined above.

Ideally, the discharge end position can correspond to the intended adjust position. As mentioned, the adjust position can preferably be set taking into account the desired sealing force and the spring stiffness of the dosing system. However, an actual discharge end position of the plunger can deviate from a previously determined adjust position during the operation of the dosing system. This can, for example, be caused by a thermally induced change in length of the piezo actuator and/or wear of moving components and/or a change in a temperature of a housing of the dosing system and/or a change in an ambient temperature of the dosing system. Correspondingly, the actual sealing position actuator deflection (as an actual value) can also deviate from a "target value" of the sealing position actuator deflection (to reach the adjust position).

To determine the actual value that represents the sealing position actuator deflection, the actual portion of the actuator deflection (of the first actuator) can be determined, which portion presses the plunger into the nozzle starting from the full contact position up to the discharge end position. The actual value of the value representing the sealing position actuator deflection can result from a difference between the maximum actuator deflection during operation and the actuator deflection until full contact is reached. The actual value of the current sealing position actuator deflection can preferably be a voltage difference between a maximum electrical control voltage applied to the piezo actuator (as the first actuator) during operation and the electrical control voltage required to bring the plunger into the full contact position.

In order to regulate the discharge end position during operation to a specific adjust position, a difference between the actual value of the value representing the sealing position actuator deflection and a target value of a value representing the sealing position actuator deflection can be determined in a further step of the regulation algorithm. Particularly preferably, the expansion material element can be regulated as a function of the determined difference such that the target value of the value representing the sealing position actuator deflection is reached during operation.

This target value of the value representing the sealing position actuator deflection is preferably associated with a specific adjust position. This means that the plunger can be moved to the desired adjust position by regulating this target value ("target sealing position actuator deflection"). The target value can preferably be a voltage difference between the control voltage for reaching the full contact position and the maximum electrical control voltage applied to the (first) actuator during operation. The target value of the sealing position actuator deflection can be preset at the factory and is preferably stored in the control unit, for example, in an EEPROM. Alternatively or additionally, the target value of the sealing position actuator deflection can also be stored in a separate memory, preferably an EEPROM, of the dosing system and ready for retrieval. The target value can, for example, be a percentage value of a maximum possible stroke movement of the (first) actuator or a change in length of a calibrated (first) actuator during operation. Furthermore, the target value could also be implemented by means of a force value.

The target value of the value representing the sealing position actuator deflection can preferably be set via the temperature of the expansion material element. Particularly preferably, the temperature of the expansion material element can be regulated to be constant to a specific voltage difference of the piezo actuator control voltage (as a target value).

The second actuator, particularly the expansion material element, can preferably be controlled such that for a negative deviation of the actual value from the target value of the value representing the sealing position actuator deflection, a temperature of the second actuator, particularly the expansion material element, is increased in order to set the target value of the sealing position actuator deflection. Correspondingly, for a positive deviation of the actual value from the target value of the value representing the sealing position actuator deflection, the temperature of the second actuator, particularly the expansion material element, can be reduced in order to set the target value of the sealing position actuator deflection.

The currently required temperature of the expansion material element can preferably be determined by means of the previously introduced equation (1).

As already explained, the regulation process can also be run through during a respective "opening" gradient. Correspondingly, a discharge end position of the discharge element can then be set in a first step in order to regulate the discharge end position. In a next step, a position of the discharge element can be determined as a function of a deflection of the first actuator during a retraction movement of the discharge element. The position of the discharge element can particularly preferably be determined as a function of an electrical control voltage applied to the first actuator or to the piezo actuator. For this purpose, "control voltage-plunger position" value pairs can again be captured, as described above.

In a further step, an actual value of a value representing the sealing position actuator deflection can then be determined. The actual value and the target value of a value representing the sealing position actuator deflection (of the first actuator) are defined accordingly, as was previously explained for the "closing" gradient.

In a subsequent step, the second actuator, preferably the expansion material element, can be controlled and/or regulated, particularly as a function of a difference between the actual value of the value representing the sealing position actuator deflection and a target value of the value representing the sealing position actuator deflection, so that a target value of the value representing the sealing position actuator deflection is set. The control and/or regulation of the second actuator correspondingly is preferably carried out in the manner described above for a "closing" gradient.

The described regulation process (the regulation to the target sealing position actuator deflection) can preferably be run through at regular intervals during operation of the dosing system, for example, during each discharge of the plunger. However, it is preferred to first "filter" the actual values of the sealing position actuator deflection captured for each discharge process, for example, to compensate for any measurement inaccuracies. A mean value and/or a median value from a number of individually measured values, for example, 10 individual measurements, can preferably be formed, wherein this median or mean value can then be fed back to the regulation process as the respective current reference variable (target value of the sealing position actuator deflection).

A difference between the actual value and the target value of the value representing the sealing position actuator deflection can preferably be determined in a first discharge process, wherein a "new" adjust temperature is determined as a function of the difference in order to set the adjust position under the current operating conditions.

The "new" adjust temperature determined during the (first) discharge process can preferably be taken into account for regulating the expansion material element during a subsequent (second) discharge process. This means that the adjust temperature can be continuously redetermined during operation.

Particularly preferably, the adjust temperature can be continuously redetermined as a function of a number of actual values of the sealing position actuator deflection determined immediately beforehand, particularly after "filtering" the individual values.

A particularly dynamic regulation of the expansion material element can advantageously take place by determining the current sealing position actuator deflection. Particularly, the expansion material element can be regulated such that the discharge element is brought into the adjust position with each discharge movement. Various disturbance variables such as thermal expansion effects of the piezo actuator, wear of the plunger and/or the nozzle, etc., can thereby advantageously be compensated for. Particularly, the expansion material element can, on the one hand, be regulated such that leaks can be avoided during the dispensing of the dosing substance. On the other hand, by continuously readjusting the target sealing position actuator deflection or the adjust temperature, the dosing accuracy can also be further improved in continuous operation, particularly with varying dosing requirements and/or under strongly fluctuating ambient conditions.

In order to be able to set the adjust position of the plunger particularly efficiently, the second actuator, particularly the expansion material element, as mentioned, comprises an expansion body and preferably a displaceably mounted transmitter coupled thereto, for example, a movable piston.

The expansion body, which forms the expansion material of the expansion material element, can preferably be a solid. Particularly, the expansion body can be present as a solid body at the adjust temperatures that usually occur during operation of the dosing system. For example, the expansion body can be present as a solid at temperatures up to 250° C., preferably up to 260° C., more preferably up to 350° C. The expansion body preferably has a thermally induced high coefficient of expansion, particularly a higher coefficient of expansion than a metal or a ceramic of a housing of the expansion material element. For example, the coefficient of expansion of the expansion body can be at least $23 \cdot 10^{-6}$/K, preferably at least $45 \cdot 10^{-6}$/K, more preferably at least $100 \cdot 10^{-6}$/K. A suitable material of the expansion body can be a polymer, for example, PEEK, PFA or polytetrafluoroethylene.

The expansion body can preferably be arranged in a housing or a chamber of the expansion material element, for example, in a stainless steel housing. The housing can preferably be designed in the manner of a hermetically sealable chamber. This offers the advantage of the expansion material being able to be introduced into the chamber in liquid form and hardening to a solid there, particularly without bubbles.

The second actuator, particularly the expansion material element, can preferably be coupled to the (first) actuator in an axial direction, for example, in accordance with a longitudinal extension of the piezo actuator in order to position the (first) actuator in the housing. The expansion material element in the housing of the dosing system can preferably be connected mechanically in series with the piezo actuator. The expansion material element can preferably be supported on the housing of the dosing system with at least one side, preferably one side facing away from the (first) actuator.

The expansion material element is preferably designed and arranged in the housing such that only one pressure side of the expansion material element pointing in the direction of the actuator is designed to be displaceable. The pressure side can preferably be displaced in the direction of a longitudinal axis of the actuator, particularly of the piezo actuator. This means that when the volume of the expansion body changes, the dimensions of the expansion material element change essentially only in the direction of the longitudinal axis of the actuator, wherein the lateral dimensions of the expansion material element remain predominantly constant ("forced expansion direction"). The change in volume of the expansion material can therefore be converted into a directed stroke movement in order to displace the actuator, particularly the piezo actuator, preferably in accordance with its longitudinal extension.

To position the actuator, the expansion material element, particularly its pressure side, can be coupled to the actuator by means of a transmitter. A stroke movement of the expansion material element can preferably be transmitted predominantly completely to the actuator by means of the transmitter in order to move it in the housing. As mentioned at the beginning, the coupling between the expansion material element (transmitter) and the (first) actuator does not have to be a fixed connection. The coupling can preferably take place such that an active unit composed of expansion material element and actuator is kept under constant pretension during operation, particularly also when the (first) actuator is in a non-deflected state. For example, a side of the expansion material element pointing away from the actuator could be adjustably mounted by means of an adjustable spherical cap opposite the housing of the dosing system.

Figure 2:
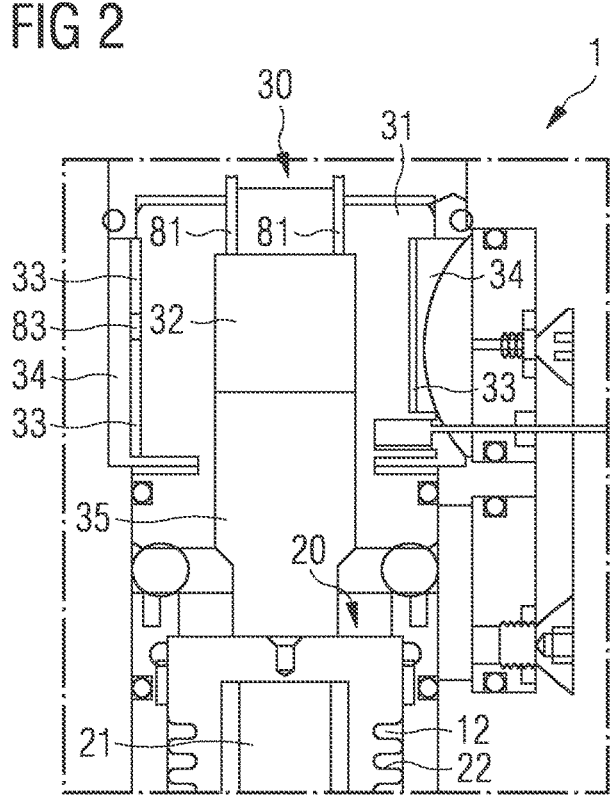
Figure 3:
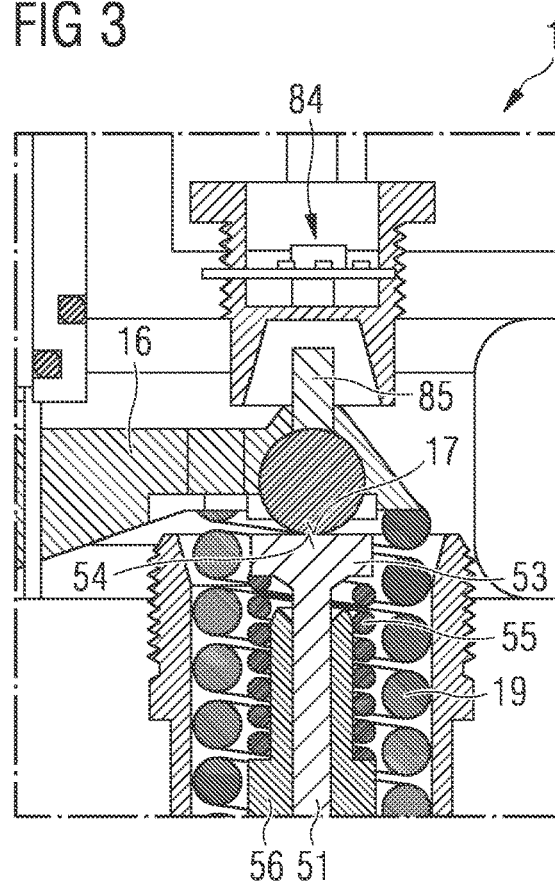
Figure 4:
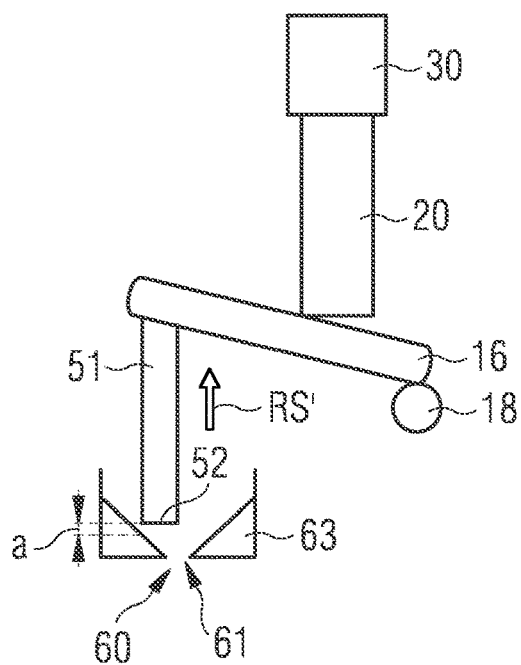
Figure 5:
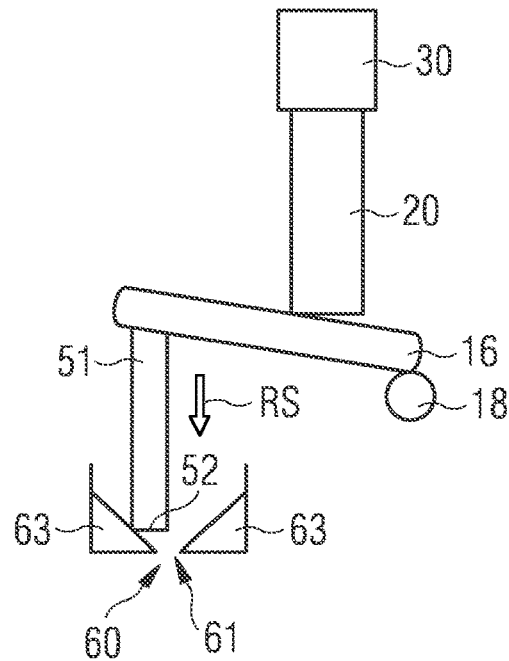
Figure 6:
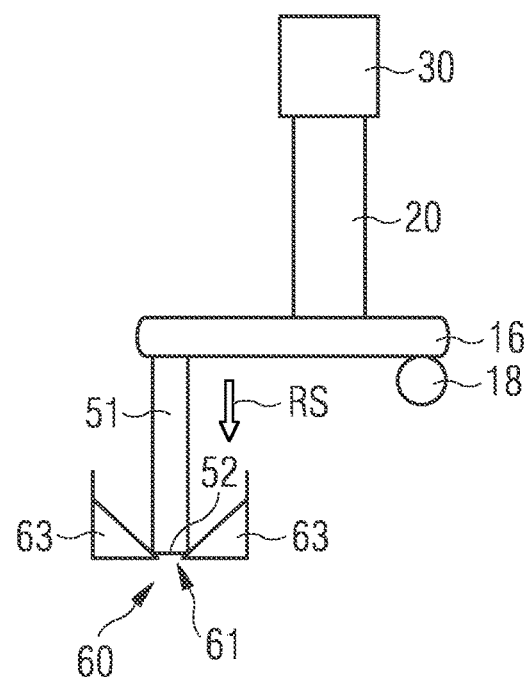
Figure 7A:
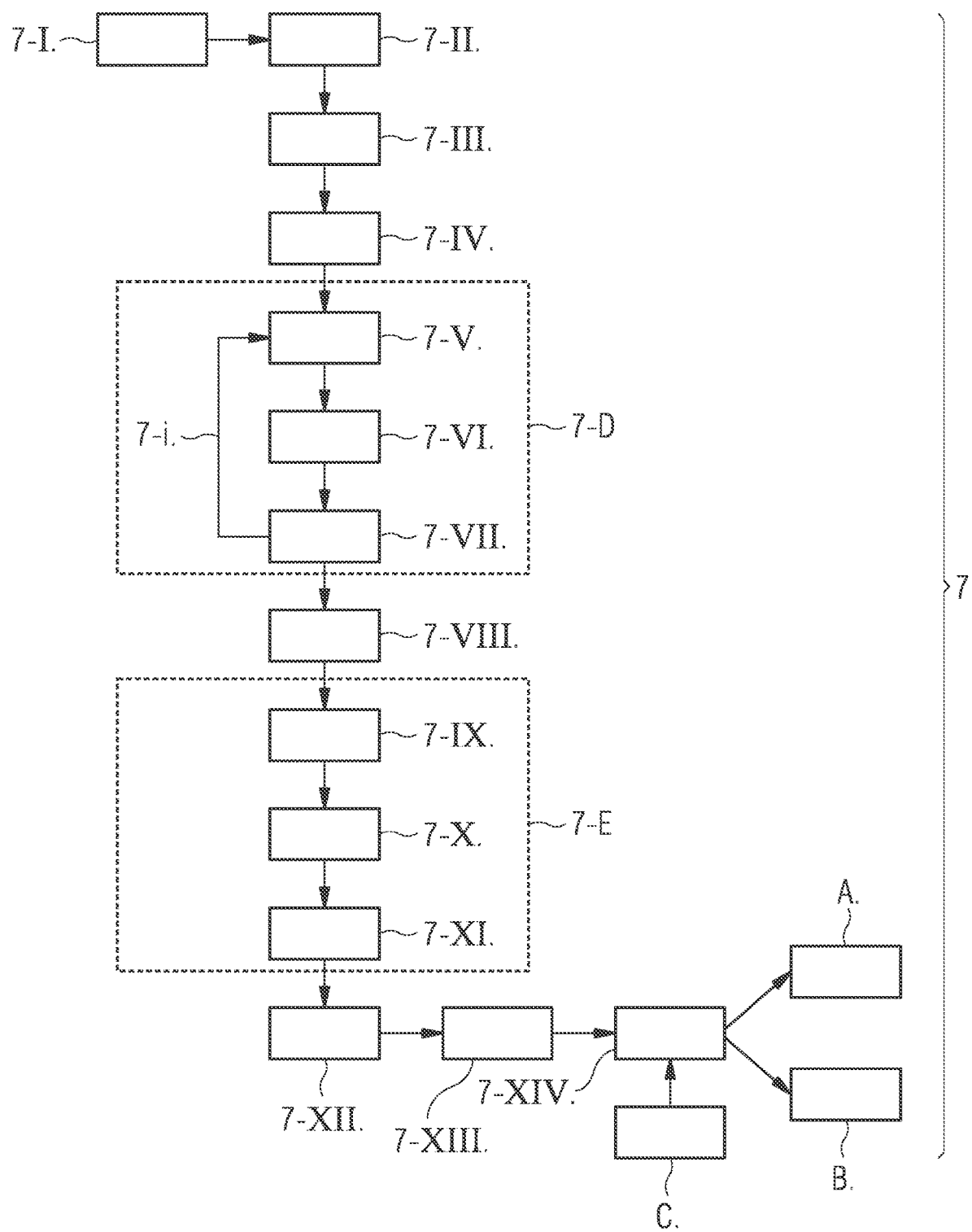
Figure 7B:
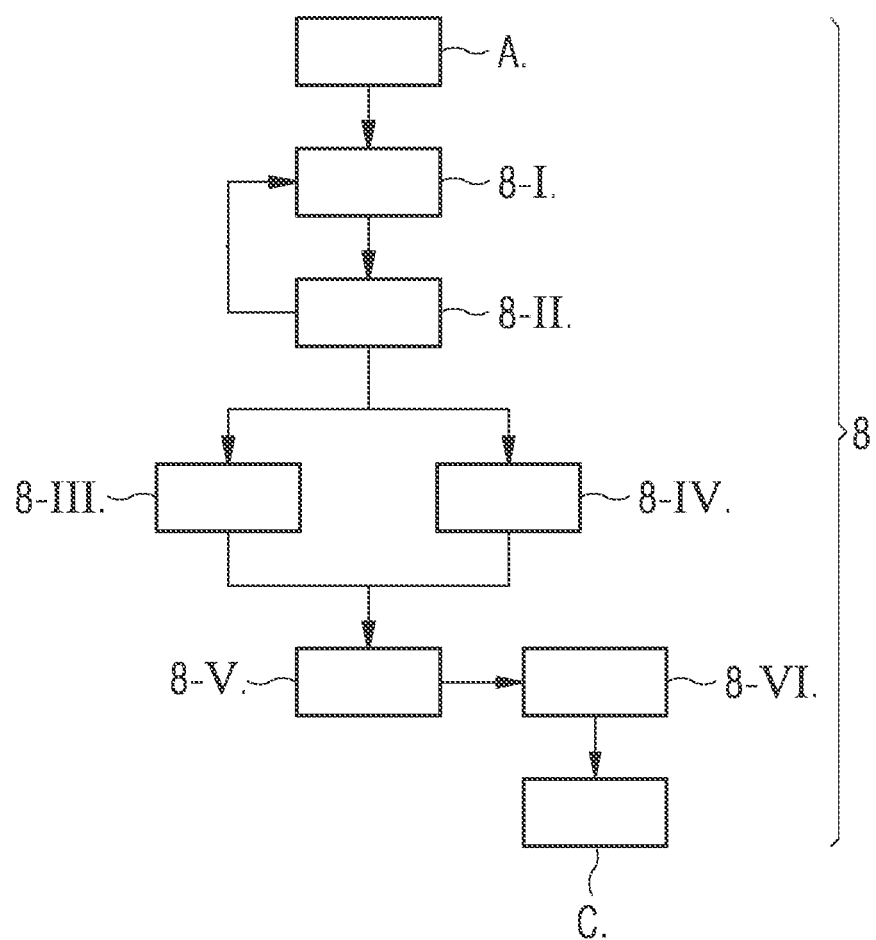
Figure 7C:
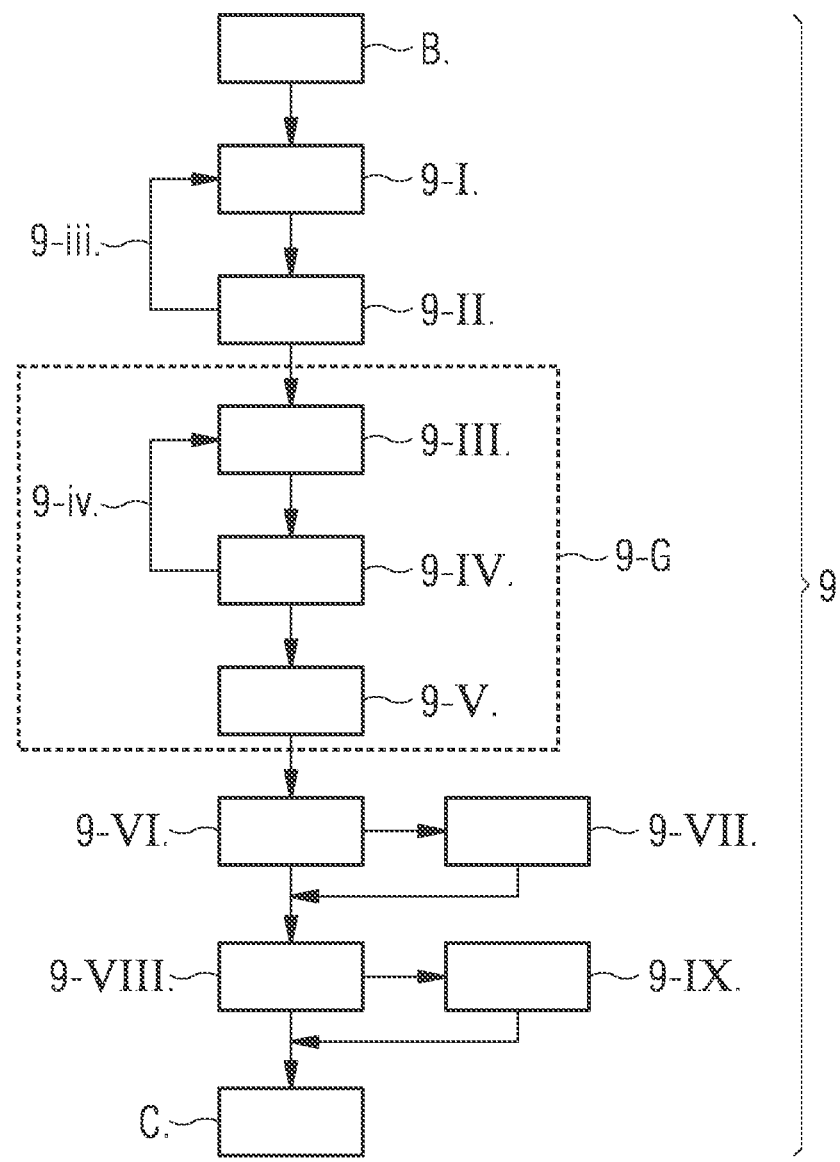
Figure 8:
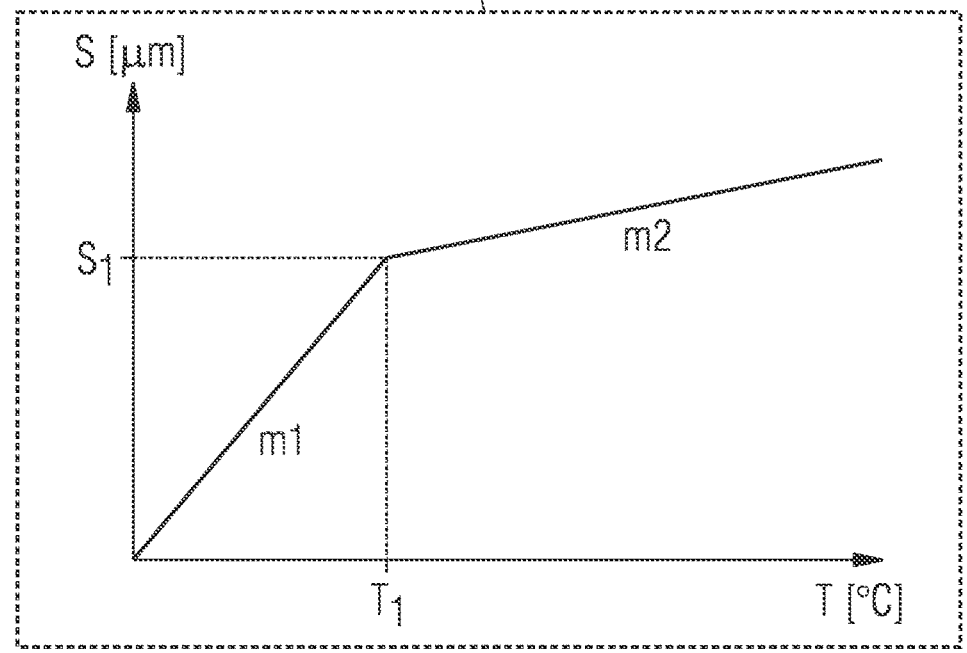

The invention is explained in more detail below with reference to the accompanying figures on the basis of embodiments. The same components are provided with identical reference numbers in the various figures. The figures are usually not to scale. They show schematically:

FIG. 1 a view shown in section of a dosing system according to an embodiment of the invention, FIGS. 2 and 3 parts of the dosing system from FIG. 1 in an enlarged view, FIGS. 4 to 6 parts of the dosing system from FIG. 1 in a further enlarged and greatly simplified view, FIGS. 7a to 7c flow charts of sections of a method for controlling the dosing system according to an embodiment of the invention, FIGS. 8 to 12 representations of function graphs to illustrate subsections of the method according to FIGS. 7a to 7c for controlling the dosing system.

A specific embodiment of a dosing system 1 according to the invention will now be described with reference to FIG. 1. The dosing system 1 is shown here in the usual intended position, for example, during operation of the dosing system 1. A nozzle 60 is located in the lower region of the dosing system 1, such that the drops of the medium are discharged in a discharge direction R through the nozzle 60 downwards. Insofar as the terms below and above are used in the following, this information therefore always relates to such a, usually conventional, position of the dosing system 1. However, this does not rule out the fact that the dosing system 1 can also be used in another position in special applications and the drops, for example, are discharged laterally. Depending on the medium, pressure and exact construction and activation of the entire discharge system, this is basically also possible. Since the basic structure of dosing systems is known, for the sake of clarity, it is predominantly those components that relate at least indirectly to the invention that are shown here.

The dosing system 1 comprises, as essential components, an actuator unit 10 and a fluidic unit 50 coupled thereto. The dosing system 1 shown here further comprises a dosing substance cartridge 66 which is coupled to the fluidic unit 50.

In the embodiment shown here, the actuator unit 10 and the fluidic unit 50 are implemented in the manner of plug-in coupling parts that can be coupled to one another to form a quick-release coupling. Advantageously, the actuator unit 10 and the fluidic unit 50 can thus be coupled to one another without tools in order to form the dosing system 1. The quick-release coupling comprises a coupling mechanism 70 having a coupling spring 71 which keeps a sphere 72 under constant pretension. The coupling spring 71 and the sphere 72 are here encompassed by a (first) housing block 11a and form a first plug-in coupling part. The first plug-in coupling part furthermore comprises a heating device 75 for heating the dosing substance in the nozzle 60.

The coupling mechanism 70 has a number of spherical caps 74 (only one shown here) into which the sphere 72 can engage for coupling. The spherical caps 74 are arranged in a second plug-in coupling part 73 of the fluidic unit 50, wherein the fluidic unit 50 is encompassed by a (second) housing block 11b. For coupling, the first plug-in coupling part and the second plug-in coupling part can be plugged into one another along a (virtual or imaginary) plug-in axis and thereby coupled to one another. For example, the fluidic unit 50 can be plugged into the actuator unit 10 against a direction R and coupled to the actuator unit 10 in a suitable rotational position.

The spherical caps 74 are arranged in the second plug-in coupling part 73 of the fluidic unit 50 such that different latching positions are possible, that is, different rotational positions of the fluidic unit 50 about the plug-in axis are possible. Due to the resiliently pretensioned sphere 72, the plug-in coupling part 73 engages in one of the several possible latching positions in order to form the dosing system 1. It should be noted, however, that the respective assemblies 10, 50 can also be fixedly connected to one another, for example, by means of a fixing screw, so as to form the housing 11 with the two housing blocks 11a, 11b.

In the embodiment shown here, the actuator unit 10 comprises two internal chambers, namely, on the one hand, an actuator chamber 12 having a piezo actuator 20 located therein and, on the other hand, an action chamber 13 into which a movable discharge element 51, here a plunger 51, of the fluidic unit 50 protrudes. Via a movement mechanism 14 having a lever 16 which protrudes from the actuator chamber 12 into the action chamber 13, the plunger 51 is actuated by means of the piezo actuator 20 such that the fluidic unit 50 discharges the medium to be dosed in the desired amount at the desired time.

The piezo actuator 20 is connected electrically or in terms of signal technology to an external control unit (not shown) in order to be activated. The piezo actuator 20 here comprises an actuator housing 22 and a piezo stack 21 hermetically encapsulated therein with respect to the environment. The piezo actuator 20 can expand and contract again in the longitudinal direction of the actuator chamber 12 in accordance with a circuit by means of the control unit. Since the basic function and activation of piezo actuators is known, this will not be discussed further.

At the upper end (pointing away from the nozzle 60) of the piezo actuator 20, the piezo actuator 20 (as the first actuator 20) is indirectly in operative contact with an expansion material element 30 (as the second actuator 30). The expansion material element 30 here comprises a housing 31 which encloses a cylindrical expansion body 32 from five sides (in cross section from three sides). The housing 31 is designed such that a thermal expansion movement of the expansion body 32 is directed predominantly in the direction of the piezo actuator 20.

The expansion body 32 adjoins a transmitter 35 on the side on which the expansion body 32 is not delimited by the chamber 31. The transmitter 35 is movably mounted in the housing 31 of the expansion material element 30 and can be displaced in the direction of a longitudinal extension of the piezo actuator 20. On a side of the transmitter piston 35, which is lower here, this adjoins the piezo actuator 20 or rests directly on an outside of the actuator housing 22. This means that the expansion body 32, the transmitter 35 and the piezo actuator 20 are in operative contact with one another such that a stroke of the expansion body 32 can predominantly be used completely for positioning the piezo actuator 20. The piezo actuator 20 can therefore be moved "up" or "down" by means of the expansion material element 30, which essentially corresponds to a discharge direction R of the dosing substance from the nozzle.

A nominal stroke of such an arrangement, that is, the extent of a possible displacement of the piezo actuator 20, depends particularly on the diameter of the expansion material element 30 used and the volume of expansion material enclosed therein, and the usable temperature range and the respective coefficient of expansion of the surrounding housing 31, which, for example, can be made of metal or ceramic, and the expansion material element 30. For thermal compensation measures, a design for a nominal stroke in the range, which can correspond to a few micrometers up to a few hundredths of a millimeter, of a piezo actuator nominal stroke or less makes sense. A nominal stroke of the expansion material element 30 of at least 10 μm, preferably of at least 50 μm and particularly preferably of at least 100 μm is provided for the combination of thermal adjust and thermal compensation described here.

The expansion material element 30 comprises a heating device 33 to control the expansion length of the expansion body 32. This is particularly clear in FIG. 2. The heating device 33 here is a heating foil 33 which rests on an outside of the housing 31 of the expansion material element 30. A temperature sensor 83 for determining a temperature of the expansion material element 30 is further arranged on the outside of the housing 31. The expansion material element 30, particularly the heating device 33, is connected by means of connection cables 81 to a "dosing system-specific" control unit 80 (FIG. 1) for activation.

The "dosing system-specific" control unit 80 is implemented here (FIG. 1) as a sub-control unit of a central external control unit (not shown) and is coupled thereto for signaling purposes by means of connection cables 81. The sub-control unit 80 can, for example, can be implemented by means of a circuit board 80 in the housing 11 of the dosing system 1. The "dosing system-specific" control unit 80 is designed to control the expansion material element 30 during operation, that is, particularly to apply corresponding control signals to the heating device 33 and a cooling device 40 in order to set a desired expansion of the expansion body 32.

The dosing system 1 from FIG. 1 further comprises a cooling device 40, wherein the cooling device 40 is designed to cool the expansion material element 30 and the piezo actuator 20 separately. The cooling device 40 here comprises some components that are used jointly for cooling the expansion material element 30 and the piezo actuator 20. This includes, among other things, a coupling point 41, for example, a connection for an external cooling medium supply, an adjoining inflow channel 42 for cooling medium and a cooling medium discharge 46.

However, the cooling device 40 comprises two separate proportional valves 43, 44 which can be activated separately by the control unit 80. The proportional valve 43 associated with the expansion material element 30 is connected to a cooling region 34 by means of a separate bore 42'. The cooling region 34 here surrounds the expansion material element 30 in a ring shape and is provided exclusively for cooling the expansion material element 30. The cooling region 34 can be flooded with cooling medium, for example, compressed and/or cooled air, via the proportional valve 43 and the bore 42', in order to cool the expansion material element 30 as required.

The cooling of the piezo actuator 20 can be controlled separately by means of the second proportional valve 44, wherein the actuator chamber 12 can be supplied with cooling medium via an inflow channel 42". The cooling of the expansion material element 30 and the piezo actuator 20 is therefore largely thermally decoupled here. The cooling medium can be discharged from the cooling region 34 or from the actuator chamber 12 via a separate outflow channel (not shown here) and then flow out of the dosing system 1 again via a jointly used outflow channel 45 and a coupling point 46 for cooling medium discharge.

In order to be able to position the piezo actuator 20 in the desired manner by means of the expansion material element 30 during operation, an active unit comprising expansion material element 30 and piezo actuator 20 is kept under constant pretension for coupling. For this purpose, the expansion material element 30 comprises a centering element 36, which is supported on the expansion material element 30 here above (FIG. 1). The centering element 36 is supported with respect to the housing 11 of the dosing system 1 and is designed to exert a certain pressure on the expansion material element 30 and thus also on the piezo actuator 20. The piezo actuator 20 is supported at its lower end via a pressure piece 23 on a lever 16 of the movement mechanism 14.

The lever 16 of the movement mechanism 14, which is used to transmit the actuator movement to the discharge element 51, rests on a lever bearing 18 at the lower end of the actuator chamber 12 and can be tilted about a tilting axis K via this lever bearing 18. A lever arm of the lever 16 protrudes through a breakthrough 15 into the action chamber 13. The breakthrough 15 thus connects the action chamber 13 to the actuator chamber 12.

In the action chamber 13, the lever arm has a contact surface 17 which points in the direction of the plunger 51 and which presses on a contact surface 54 of a plunger head 53 (FIG. 3). In FIG. 1, it becomes clear that the contact between piezo actuator 20 and lever 16 takes place in a region between the lever bearing 18 and the contact surface 17 of the lever 16 pointing to the plunger 51, wherein this contact point lies closer to the lever bearing 18 than the contact surface 17 in order to achieve the desired transmission ratio in which a small movement of the actuator 20 causes a larger movement of the discharge element 51. In the embodiment shown in FIG. 3, it is provided that the contact surface 17 of the lever 16 is permanently in contact with the contact surface 54 of the plunger head 53 in that a plunger spring 55 presses the plunger head 53 against the lever 16 from below. The plunger spring 55 is supported here downward on a plunger centering piece 56.

The lever 16 rests on the plunger 51. However, there is no fixed connection between the two components 16, 51. In principle, however, it would also be possible for the plunger spring 55 to be at a distance between the plunger 51 and the lever 16 in an initial or rest position. In order to enable an almost constant pretension of the drive system (lever-piezo actuator movement system), the lever 16 is pressed upwards by an actuator spring 19 at the end at which it comes into contact with the plunger 51 (FIG. 3).

To measure the position and/or movement of the plunger 51, a magnet 85 is arranged here on an upper side of the lever 16 pointing away from the plunger 51 and interacts with a Hall sensor 84 in the housing of the dosing system (FIG. 3). The Hall sensor 84 and the magnet 85 are arranged here on an imaginary vertical axis corresponding to the longitudinal extension of the plunger 51. A predominantly vertical stroke movement of the lever 16 can be captured by means of this arrangement 84, 85, wherein a position or movement of the plunger 51 is also able to be determined.

In FIG. 1, it becomes clear that the plunger spring 55 is supported on a plunger bearing 57, to which a plunger seal 58 adjoins at the bottom. The plunger spring 55 presses the plunger head 53 away from the plunger bearing 57 in the axial direction upwards. A plunger tip 52 is thus also pressed away from a sealing seat 63 of the nozzle 60. That is, without external pressure from above on the contact surface 54 of the plunger head 53, the plunger tip 52 is located at a distance from the sealing seat 63 of the nozzle 60 in the rest position of the plunger spring 55. A nozzle opening 61 is thus also not closed in the rest state (non-expanded state) of the piezo actuator 20.

The dosing substance is supplied to the nozzle 60 via a nozzle chamber 62 to which a feed channel 64 leads. At its other end, the feed channel 64 opens into the dosing substance cartridge 66, wherein the cartridge 66 is fastened directly to the housing 11 via a coupling point 65, here on the second housing part 11b. The dosing substance cartridge 66 is releasably fixed to the dosing system 1 by means of a cartridge holder 67 and has a compressed air supply 68 at the upper end here, for example, to set a certain pressure of the dosing substance in the dosing substance cartridge 66.

The fluidic unit 50 further has a connection cable 69 in order to activate a heating device (not shown) of the fluidic unit 50. In addition, the dosing substance can be temperature controlled separately in the fluidic unit 50, for example, other than in the nozzle 60. The dosing system 1 can preferably comprise a plurality of differently temperature-controllable heating zones for the dosing substance, wherein a first heating zone can be associated with the nozzle 60, a second heating zone with the fluidic unit 50 and a third heating zone with the cartridge 66.

The essential steps of an adjustment process for setting an adjust position of the plunger are shown schematically in FIGS. 4 and 6. The parts of the dosing system shown correspond to those from FIG. 1, but are shown greatly simplified and enlarged. The dosing system shown here is a "real" system, wherein the distances between the individual components of the dosing system and their movements during adjustment are shown greatly enlarged for clarity.

A start of the adjustment process is shown in FIG. 4. First, the piezo actuator 20 (as the first actuator 20) is activated such that a maximum electrical control voltage provided during operation of the dosing system is applied to the piezo actuator 20, that is, the piezo actuator 20 is fully expanded. As already explained, the piezo actuator 20 rests on the lever 16, which in turn is in contact at its other end with the plunger 51. In a next step, an adjustment start temperature is set in the expansion material element 30 (as the second actuator 30). For this purpose, the expansion material element 30 can be cooled to a certain temperature, such that the expansion material element 30 contracts at least slightly if it is in a heated state. The piezo actuator 20, however, is still expanded as before. Since the piezo actuator 20 and the plunger 51 form a movement unit, the plunger 51 can be moved slightly away from the nozzle 60 in an upward direction RS' as a result of the contraction of the expansion material element 30, this process being shown here, as said, greatly enlarged for the sake of clarity. Accordingly, a distance a is established between the plunger tip 52 and the sealing seat 63.

In a subsequent step (FIG. 5), the expansion material element 30 is heated starting from the adjustment start temperature. The thermally induced expansion of the expansion material element 30 is transmitted to the plunger 51 via the piezo actuator 20 and the lever 16, wherein the plunger 51 is moved in a downward direction RS in the direction of the nozzle 60.

In FIG. 5, the moment of initial contact is specifically shown, wherein only a left region of the plunger tip 52 makes contact with the sealing seat 63 of the nozzle 60 for the first time. The nozzle opening 61 is not yet closed by the plunger 51. The plunger position shown here therefore corresponds to an initial contact position of the plunger 51 and not a full contact. It should be pointed out again that a "real" dosing system is shown in FIGS. 4 to 6. In contrast to this, in the case of an "ideal" dosing system, the initial contact (FIG. 5) can be omitted, wherein the plunger 51 is moved directly into the full contact position (FIG. 6). That is, the initial contact then already corresponds to the full contact.

Finally, in FIG. 6, the plunger 51 is arranged in a full contact position. For this purpose, the expansion material element 30 is heated further after the initial contact until the plunger 51 "slides" essentially in the downward direction RS into the nozzle 60, wherein full contact is achieved. Starting from the initial contact (FIG. 5), the plunger tip 52 "slides" along a left part of the conical sealing seat 63 until the plunger tip 52 finally seals the nozzle opening 61 in a ring (full contact). The piezo actuator 20 is still expanded as before. The full contact position of the plunger 51 shown here can, depending on the configuration of the dosing system, correspond to the adjust position of the plunger 51, wherein a certain sealing force additionally is exerted by the plunger on the sealing seat 63 in the adjust position.

Further details of the adjustment process can also be found in FIGS. 7a-c to 9.

FIG. 7a shows a first section of a control method for controlling a dosing system according to an embodiment of the invention. Procedure step 7 shown here can be used to set the adjust position of the plunger in an adjustment process or adjust process. The adjustment process can preferably run fully automatically after initial initiation, for example, in that the individual method steps are processed by the "dosing system-specific" control unit. The adjust process is described below (FIGS. 7 to 9) using an "ideal" non-rigid dosing system. This means that full contact between the plunger and nozzle is achieved without prior initial contact.

In a first step 7-I. of procedure step 7, the adjustment process is started, for example, by means of an input to the "dosing system-specific" control unit or to a central control unit. In step 7-II., a maximum deflection of the piezo actuator during operation is initially set or a maximum electrical control voltage provided during operation is applied to the piezo actuator. At the same time, a trigger for dispensing the dosing substance is blocked for the duration of the adjust process. In step 7-III., an adjustment start temperature is set in the expansion material element, for example, by means of cooling. In step 7-IV., the expansion material element is then continuously heated starting from the adjustment start temperature.

The plunger position is measured in relation to the temperature of the expansion material element (step 7-V.) during the heating of the expansion material element. "Temperature-plunger position" value pairs are continuously formed and stored (step 7-VI.). A check is carried out at regular intervals on the basis of the value pairs to determine whether full contact between the plunger and nozzle has already been detected (step 7-VII.). If full contact has not yet been detected, further value pairs are captured according to iterative step 7-i. Iterative step 7-i. is run through until a full contact is detected.

The determination of the full contact takes place in the procedure sub-step 7-D. For this purpose, a function graph of the change in the plunger position S (in μm) in relation to the rise in temperature T (in ° C.) of the expansion material element is shown schematically in FIG. 8. The plunger position S, for example, can be determined via a distance between the plunger head and Hall sensor. It can be seen that, based on the adjustment start temperature (here at the origin of the coordinate system), a predominantly linear (adjustment) ratio is initially established between the plunger position S and the temperature T of the expansion material element. The ratio is shown here as a straight line having a slope m1, wherein the straight line results from the previously captured "temperature-plunger position" value pairs.

As soon as there is full contact between the plunger and nozzle and the plunger is pressed into the nozzle, the plunger position S changes more slowly than before full contact despite the continuous temperature rise T. A new ratio is therefore established between the plunger position S and temperature T, which ratio is shown here as a straight line having a flatter slope m2. The plunger position $S_1$, at which the slope of the straight line changes from m1 to m2, corresponds to the full contact position $S_1$ of the plunger. The flat slope m2 results from a slight movement of the plunger due to an elastic deformation of components of the dosing system, wherein the slope m2 can be a measure of the spring stiffness of the system. The full contact position $S_1$ is associated with a full contact temperature $T_1$ here.

The duration until full contact is reached can be, for example, in about 1 minute. It is also conceivable to heat the expansion material element dynamically in order to achieve full contact more quickly. For example, the expansion material element can be heated to different degrees in different phases, wherein a mean slope m1 is then able to be captured. This calibration could also be carried out by the manufacturer and stored in the dosing system.

As soon as the full contact in step 7-VII. is detected, the full contact position $S_1$ of the plunger in step 7-VIII. is stored (FIG. 7a).

In step 7-IX., the slope m1 (FIG. 8) can then be determined until full contact is reached, preferably as a function of the previously determined "temperature-position" value pairs. In step 7-X., the spring stiffness of the dosing system can then be determined, for example, by reading out the calibration data stored in the dosing system at the factory. In step 7-XI., the adjust position of the plunger can finally be calculated, particularly taking into account the full contact position ($S_1$), the slope m1 (both in FIG. 8) and the spring stiffness of the overall system. The calculation of the adjust position is possible, for example, using the previously introduced equation (1). Furthermore, in step 7-XI., an adjust temperature that is associated with the adjust position can be determined.

Figure 9:
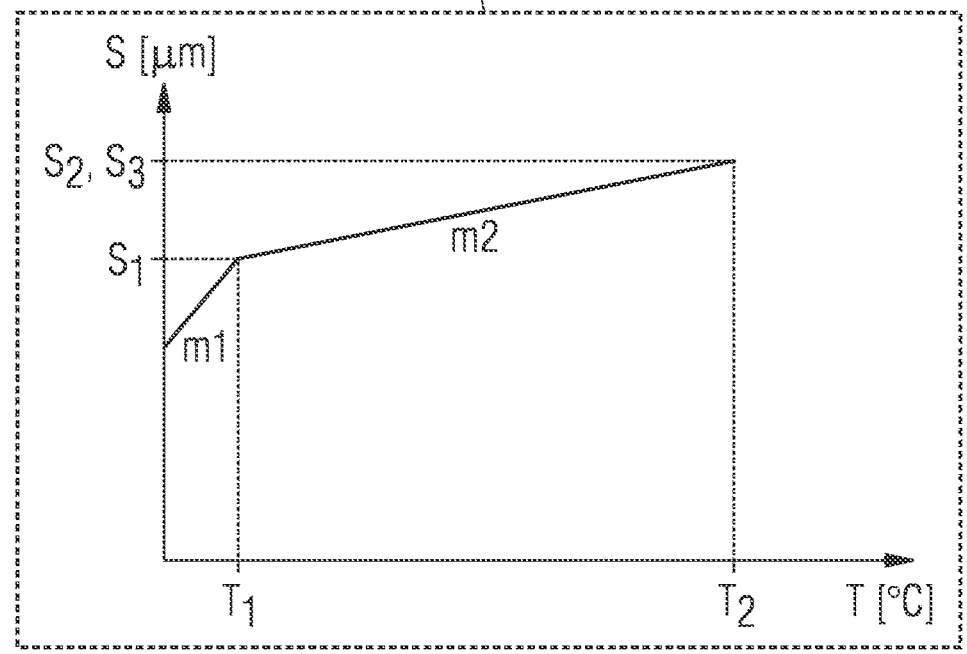

The determination of the adjust position in procedure sub-step 7-E is shown schematically in FIG. 9 using a function graph of the change in the plunger position S (in μm) in relation to the increase in temperature T (in ° C.) of the expansion material element. The adjust position ($S_2$) of the plunger differs slightly here from the full contact position ($S_1$) of the plunger. The reason is that the adjust position ($S_2$) is shown here for a non-rigid dosing system, wherein after full contact ($S_1$), there is still a slight plunger movement corresponding to the slope m2. In order to build up a certain sealing force despite the slight plunger movement into the adjust position ($S_2$), the spring stiffness of the dosing system can be taken into account when calculating the adjust position ($S_2$). The adjust position ($S_2$) is associated with an adjust temperature ($T_2$) of the expansion material element. The adjust position ($S_2$) here also corresponds to a discharge end position ($S_3$) of the plunger.

In contrast to what is shown here, the adjust position $S_2$ of the plunger can essentially correspond to the full contact position $S_1$ in a very rigid "ideal" dosing system, that is, the full contact position ($S_1$), the adjust position ($S_2$) and the discharge end position ($S_3$) then essentially coincide.

The adjust position and the associated adjust temperature are stored (FIG. 7a) in step 7-XII. It is then reported to the control unit that the adjustment process has ended (step 7-XIII.). With this, the blockade of the trigger of the dispensing of dosing substance can be removed. In step 7-XIV., the operating mode of the dosing system is finally queried, that is, a decision is made as to whether the dosing system should switch to a standby mode (jump label A.) or switch to the dosing process (jump label B.).

FIG. 7b shows a further section of the control method for controlling the dosing system according to an embodiment of the invention. Procedure step 8 shown here follows directly on to the jump label A. from FIG. 7a. Procedure step 8 is therefore carried out if the query of the operating mode in step 7-XIV. (FIG. 7a) has resulted in a change of the dosing system into hold mode.

In the first step 8-I. (FIG. 7b), the adjust temperature determined in a previously carried out adjustment process is called up. The adjust temperature is transmitted to a PID controller or fuzzy controller of the dosing system (step 8-II.). The expansion material element can be cooled (step 8-III.) or heated (step 8-IV.) by means of the PID controller in order to set the adjust temperature in the expansion material element (step 8-V.). In step 8-VI., the desired actuator position or plunger position is set in the dosing system via the expansion material element. Procedure step 8 ends at jump label C. This is followed again by the query of the operating mode in FIG. 7a (step 7-XIV.).

A further section of the control method for controlling the dosing system is shown in FIG. 7c. Procedure step 9 shown here follows directly on to the jump label B. from FIG. 7a. Procedure step 9 is therefore carried out if the query of the operating mode in step 7-XIV. (FIG. 7a) has resulted in a change of the dosing system to the "active" dosing mode.

In a first step 9-I. (FIG. 7c), the electrical control voltage currently applied to the piezo actuator is determined. In step 9-II., it is determined whether the current control voltage corresponds to a no-load voltage of the piezo actuator, wherein the piezo actuator is in a rest position, that is, is not expanded. If the current control voltage does not correspond to the open-circuit voltage, that is, the piezo actuator is at least partially expanded, the current operating voltage of the piezo actuator is measured again corresponding to the iterative process step 9-iii. The iterative process step 9-iii. is run through until the current control voltage corresponds to the open-circuit voltage of the piezo actuator (step 9-II.), that is, until the plunger is in the discharge start position.

In step 9-III., starting from the discharge start position during a single discharge process, the change in electrical actuator voltage over time and the plunger position corresponding to the respective actuator voltage are measured. For this purpose, "control voltage-plunger position" value pairs are preferably formed over time. The electrical control voltage currently applied to the piezo actuator is determined in step 9-IV. If the control voltage does not yet correspond to a maximum control voltage (expansion voltage) provided during operation, value pairs continue to be formed according to the iterative step 9-iv. The iterative step 9-iv. is run through until the current control voltage corresponds to the expansion voltage of the piezo actuator (step 9-IV.), that is, the plunger is in the discharge end position. In step 9-V., the sealing position actuator deflection is determined, for example, on the basis of the formed "control voltage-plunger position" value pairs. Further details on this or on procedure sub-step 9-G are explained below with reference to FIGS. 10 to 12.

Alternatively or additionally, it is also possible to carry out the process described above, particularly the capturing of "control voltage-plunger position" value pairs over time, with an opening gradient. This can have the advantage that the opening gradient proceeds more slowly than the closing gradient, wherein an even higher measurement accuracy can be achieved. In this variant, the iterative sub-step 9-iii. can be run through until a maximum control voltage (expansion voltage) provided during operation is applied to the piezo actuator, wherein the piezo actuator reaches its greatest possible deflection during operation (step 9-II.). In step 9-III., then, starting from the discharge end position of the plunger, the change in the electrical actuator voltage over time and the plunger position corresponding to the respective actuator voltage are measured during a single retraction movement of the plunger. For this purpose, "control voltage-plunger position" value pairs are preferably formed over time. The electrical control voltage currently applied to the piezo actuator is determined in step 9-IV. If the control voltage does not yet correspond to the open-circuit voltage of the piezo actuator, value pairs continue to be formed according to the iterative step 9-iv. The iterative step 9-iv. is run through until the current control voltage corresponds to the open-circuit voltage of the piezo actuator (step 9-IV.), that is, the plunger is in the discharge start position. In step 9-V., the sealing position actuator deflection is determined, for example, on the basis of the formed "control voltage-plunger position" value pairs.

Figure 10:
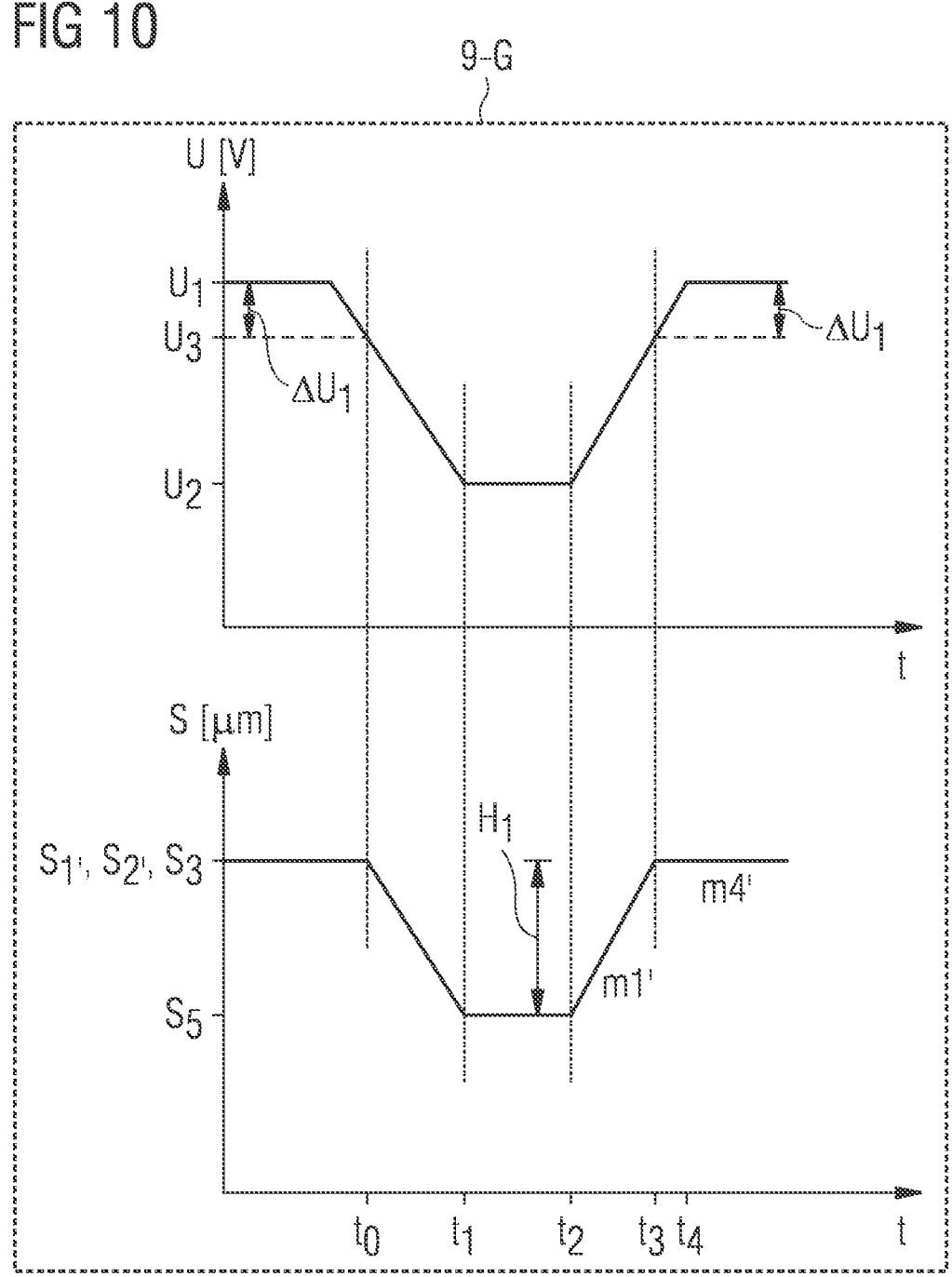

Procedure sub-step 9-G is described separately below for the different types of dosing systems. In FIG. 10, the procedure sub-step 9-G is shown for an "ideal" very rigid dosing system. In the upper part here, a function graph of the time profile of the electrical control voltage U (in V) applied to the piezo actuator is shown schematically over time t (in arbitrary units). In the lower part of FIG. 10, the plunger position S (in μm) corresponding to the control voltage (U) is shown for the same time period.

At the beginning of the recording, a voltage $U_1$ is applied to the piezo actuator, which voltage corresponds to the expansion voltage of the piezo actuator, that is, the piezo actuator is initially expanded. Correspondingly, the plunger is arranged in the discharge end position $S_3$ during the same time period, which here simultaneously corresponds to the full contact position $S_{1'}$ and the adjust position $S_{2'}$. As a result of a reduction in the control voltage U, the plunger moves away from the nozzle at time $t_0$ and thus releases the nozzle opening. At time $t_1$, control voltage $U_2$ corresponds to the open-circuit voltage of the piezo actuator, that is, the piezo actuator is no longer expanded. Accordingly, the plunger is temporarily in the discharge start position $S_5$. The regulation algorithm for adjusting the discharge end position $S_{1'}$ to the adjust position $S_{2'}$ can, as stated, take place during a respective opening and/or closing gradient. The regulation process during a closing gradient is described below, that is, starting at time $t_2$.

At time $t_2$, that is, at the beginning of the discharge process, an electrical control voltage U is applied to the piezo actuator. The control voltage U is continuously increased, wherein a predominantly linear ratio between control voltage U and time t forms (upper part of FIG. 10; time $t_2$ to $t_4$). When the control voltage U is applied at time $t_2$, the plunger is deflected again in the direction of the nozzle by the expanding piezo actuator. In the time period $t_2$ to $t_3$, a first, predominantly constant plunger speed is initially established (corresponds to m1'). Accordingly, a first (speed) ratio is formed between the change in the control voltage U of the piezo actuator and the plunger speed resulting therefrom.

At time $t_3$, the plunger speed suddenly slows down, wherein a new plunger speed (corresponds to m4') is established. In this case, the plunger speed approaches zero after $t_3$. At time $t_3$, an electrical voltage $U_3$ is applied to the piezo actuator. However, since the control voltage of the piezo actuator continues to increase continuously even after time $t_3$ or beyond $U_3$, a new (speed) ratio is established between the change in the control voltage and the plunger speed. The time $t_3$ or the plunger position $S_{1'}$, $S_{2'}$, $S_3$ at which the change in the (speed) ratio takes place corresponds here to the full contact position $S_{1'}$ of the plunger. Since this is an "ideal" and very rigid dosing system, the full contact position $S_{1'}$ already corresponds to the discharge end position $S_3$ and also the adjust position $S_{2'}$ of the plunger.

The electrical control voltage U of the piezo actuator is further increased beyond $U_3$ until the expansion voltage $U_1$ is finally applied again to the piezo actuator at time $t_4$.

An actual value of a value representing the sealing position actuator deflection can then be determined on the basis of the thus determined full contact position $S_1$ and the electrical control voltage $U_3$ of the piezo actuator associated with this position $S_1$. In this case, the value that represents the sealing position actuator deflection corresponds to a voltage difference $\Delta U_1$ between the maximum electrical control voltage $U_1$ applied to the piezo actuator during operation and the control voltage $U_3$ that is necessary to bring the plunger into the full contact position $S_1$. The sealing position actuator deflection $\Delta U_1$ determined in this way, that is, here the voltage difference $\Delta U_1$ of the control voltage applied to the piezo actuator, causes a sealing force of the plunger against the nozzle to build up from time $t_3$. That is, the voltage difference $\Delta U_1$ is here essentially completely converted into a sealing force of the plunger. In contrast, the remaining portion of the control voltage applied to the piezo actuator, that is, the difference between $U_3$ and $U_2$, is converted into a movement of the plunger, wherein a (hydraulically) effective stroke $H_1$ is effected here.

Figure 11:
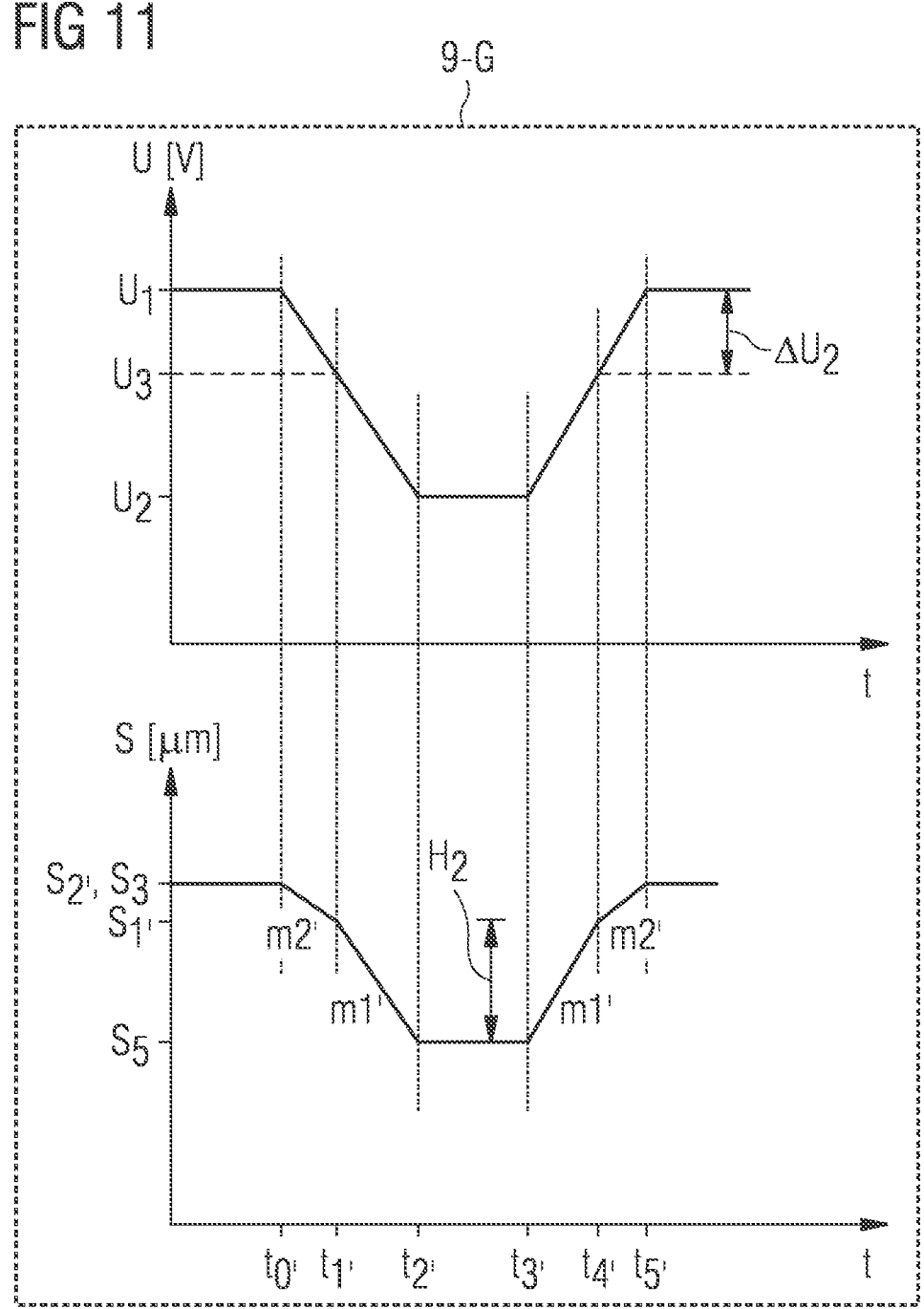

In FIG. 11, the procedure sub-step 9-G is shown for an "ideal" non-rigid dosing system. Analogous to FIG. 10, a function graph of the time profile of the electrical control voltage U applied to the piezo actuator (in V) over time t (in arbitrary units) is shown schematically in the upper part here, wherein the plunger position S (in μm) corresponding to the control voltage (U) is shown in the lower part for the same time period.

In FIG. 11, the determination of the sealing position actuator deflection is described on the basis of an opening gradient. An expansion voltage $U_1$ is again applied to the piezo actuator at the beginning of the recording. The electrical control voltage is reduced at time $t_{0'}$, wherein a pressure built up in the piezo actuator slowly starts to decrease as a result of the expansion. This means that during this time period ($t_{0'}$ to $t_{1'}$), initially only the sealing force that the plunger exerts against the nozzle is predominantly reduced. The electrical control voltage U is reduced from $U_1$ to $U_3$ in this time period ($t_{0'}$ to $t_{1'}$), wherein the difference between $U_1$ and $U_3$ here corresponds to the sealing position actuator deflection $\Delta U_2$.

In the time period $t_{0'}$ to $t_{1'}$, in addition to the reduction in the sealing force, there is also a slight plunger movement, wherein the plunger slowly moves from the discharge end position $S_3$ or the adjust position $S_{2'}$ into the full contact position $S_{1'}$. This slight plunger movement corresponding to the slope m2' is caused by an elastic (reversible) deformation of components of the dosing system. The continuously decreasing actuator pressure leads to the fact that the components compressed during a previous discharge process, for example, the fluidic unit, can "relax" or "reshape" and align again according to a non-compressed (target) arrangement. Correspondingly, the plunger can return from the discharge end position $S_3$ to the full contact position $S_{1'}$ during this time period, wherein the control voltage U of $U_1$ and $U_3$ is reduced.

The difference $\Delta U_2$ of these two voltage values $U_1$, $U_3$ (sealing position actuator deflection) can therefore also be used for the most part to build up sealing force in such a non-rigid dosing system, wherein a small proportion of the sealing position actuator deflection is converted into an elastic deformation of components of the dosing system (unlike in the completely rigid dosing system from FIG. 10).

In order to nevertheless achieve a certain sealing force, the spring stiffness of the overall system can be taken into account or compensated accordingly when calculating the adjust position $S_{2'}$ (for example, according to equation 1). For this purpose, for example, the sealing position actuator deflection $\Delta U_2$ can be increased accordingly, wherein the (hydraulically) effective stroke $H_2$ can in turn be reduced.

In the time period $t_{1'}$ to $t_{2'}$, the plunger position then changes faster than before, corresponding to a slope m1'. Due to the decreasing actuator voltage U and a spring system of the dosing system, the longitudinal extension of the piezo actuator is contracted, wherein the plunger is moved from the full contact position $S_{1'}$ back to the discharge start position $S_5$. The control voltage U of the piezo actuator is increased again at time $t_{0'}$, wherein the plunger is deflected again in the direction of the nozzle and at time $t_{4'}$, first the full contact position $S_{1'}$, and, with a certain sealing force being built up and a slight movement of the plunger, the discharge end position $S_3$ is finally reached at time $t_{5'}$, which discharge end position corresponds to the adjust position $S_{2'}$ of the plunger in the regulated state of the dosing system.

Figure 12:
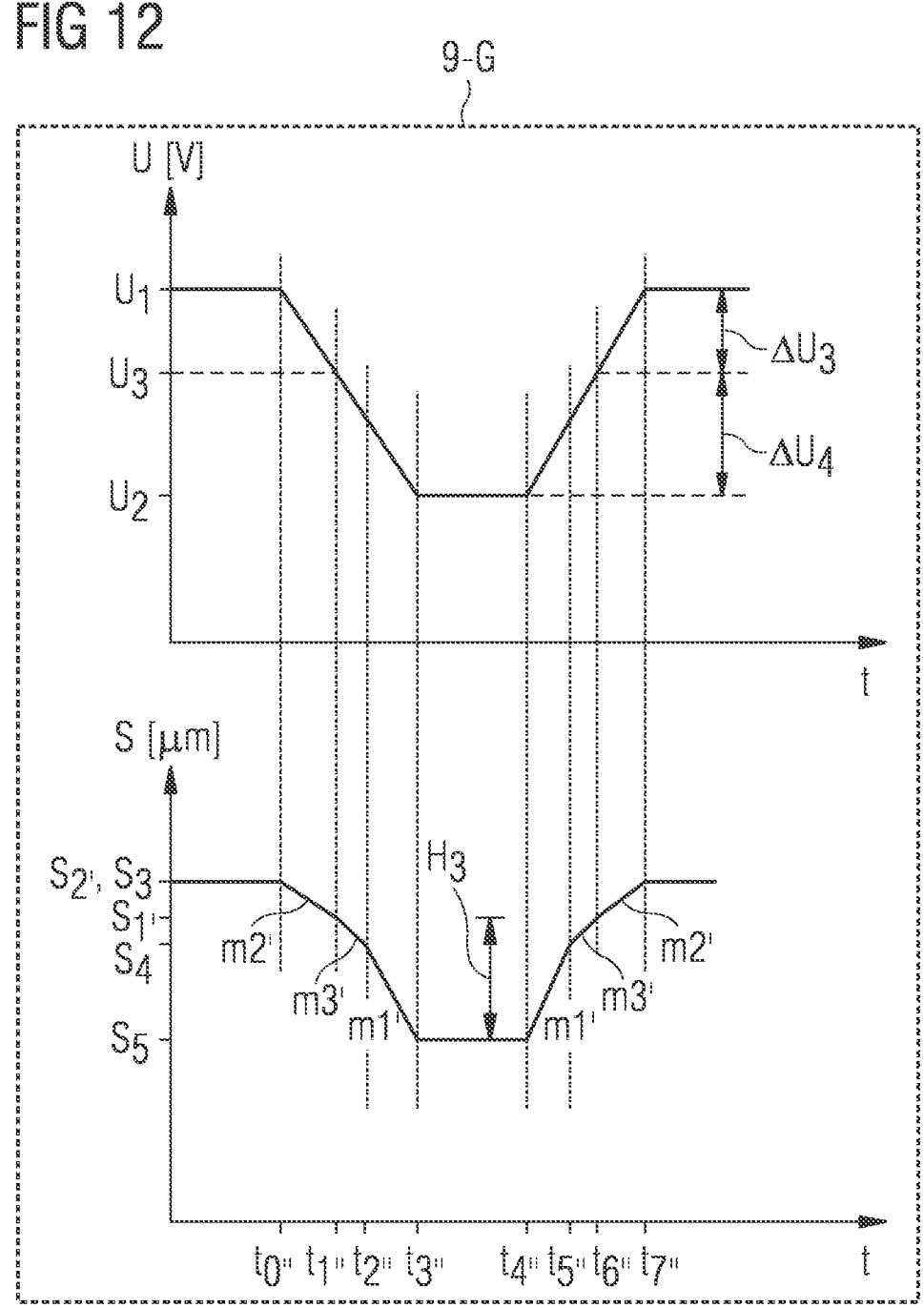

In FIG. 12, the procedure sub-step 9-G is now shown for clarification for a "real", non-rigid dosing system on the basis of a closing gradient, wherein the basic structure of FIG. 12 corresponds to that of FIGS. 10 and 11 (time profile of the electrical control voltage U above; plunger position S corresponding to the control voltage U below). Starting from the discharge start position $S_5$ of the plunger, a continuous increase in the electrical control voltage U applied to the piezo actuator results in the plunger being moved at a first speed (corresponds to m1') in the direction of the nozzle (time period $t_{4'''}$ to $t_{5'''}$). The plunger speed slows down (corresponding to m3') at time $t_{5'''}$, wherein the control voltage is further increased continuously. Correspondingly, at $t_{5'''}$, a new (speed) ratio is established between the change in the control voltage U of the piezo actuator and the plunger speed resulting therefrom. The reason for the slowing down of the plunger at time $t_{5'''}$ is an initial contact between the plunger and nozzle, wherein $S_4$ corresponds to the initial contact position.

The plunger is deflected beyond $S_4$ against a certain resistance of the nozzle further in the direction of the nozzle until the plunger has "slipped" completely into the nozzle at time $t_{6'''}$, thus achieving full contact ($S_{1'}$). The slope m3' thus represents the "sliding in" of the plunger into this nozzle, particularly into the full contact position $S_{1'}$. An electrical control voltage $\Delta U_4$ is required to move the plunger from the discharge start position $S_5$ to the full contact position $S_{1'}$, which electrical control voltage results from a difference between $U_3$ and $U_2$ (open-circuit voltage) of the piezo actuator.

The control voltage difference $\Delta U_4$ is part of the maximum control voltage $U_1$ applied to the piezo actuator during operation, wherein $\Delta U_4$ is predominantly completely converted into the (hydraulically) effective stroke $H_3$ of the plunger (and therefore essentially does not lead to the build-up of sealing force). The (hydraulically) effective stroke $H_3$ here also corresponds to the plunger movement from the discharge start position $S_5$ to the full contact position $S_{1'}$.

At full contact (time $t_{6'}$) the (speed) ratio changes again and the plunger is only moved very slightly (corresponding to m2') to a discharge end position $S_3$ (time $t_{7'''}$). As explained with reference to FIG. 11, the slope m2' is caused by a slight elastic deformation of components of the dosing system. In addition, in the time period $t_{6'''}$ to $t_{7'''}$, a sealing force of the plunger is predominantly built up via the sealing position actuator deflection $\Delta U_3$.

On the basis of the actual sealing position actuator deflection determined in each case (actual value $\Delta U_1$, $\Delta U_2$, $\Delta U_3$, hereinafter only $\Delta U$) it can then be determined in a step 9-VI. (FIG. 7c) via a comparison with a target value of the value representing the sealing position actuator deflection whether the current sealing position actuator deflection (here the voltage difference $\Delta U$ of the control voltage) is less than the target value. If the query shows that the target value is undershot, then according to step 9-VII., a temperature of the expansion material element increases, so that the target value of the sealing position actuator deflection (here a certain target voltage difference) is reached.

If the target value is not undershot (step 9-VI.), it is checked in step 9-VIII. whether the current sealing position actuator deflection (here the voltage difference $\Delta U$ of the control voltage) exceeds the target value. Optionally, then in step 9-IX., the temperature of the expansion material element is reduced in order to set the target value of the sealing position actuator deflection. If no deviation of the actual value ($\Delta U$) of the sealing position actuator deflection from the target value is detected, a change is made directly to jump label C. without any regulation of the expansion material element. The query of the operating mode follows the jump label C. again (FIG. 7a; step 7-XIV.).

Finally, it is pointed out once again that the dosing systems or control methods for dosing systems described in detail above are merely embodiments which can be modified in the most varied of ways by the person skilled in the art without departing from the scope of the invention. Thus, for example, in the case of the control method explained, it is not always necessary to run through all the method steps, or the method steps could also be processed in a different order. Furthermore, the regulation algorithm can also be run through during the respective other "opening" or "closing" gradient not described in the context of the application. Furthermore, the use of the indefinite article "a" or "an" does not exclude the possibility that the relevant features can also be present more than once.

LIST OF REFERENCE SYMBOLS 1 dosing system
10 actuator unit
11 housing
11a, 11b housing block/components of the housing
12 actuator chamber
13 action chamber
14 movement mechanism
15 breakthrough
16 lever
17 lever contact surface
18 lever bearing
19 actuator spring
20 first actuator/piezo actuator
21 piezo stack
22 piezo actuator housing
23 pressure piece
30 second actuator/expansion material element
31 housing (expansion material element)
32 expansion body
33 heating device (expansion material element)
34 cooling region/cooling chamber (expansion material element)
35 piston
36 centering element
40 cooling device
41 coupling point for cooling medium supply
42, 42', 42" inflow channel (cooling medium)
43 proportional valve (expansion material element)
44 proportional valve (piezo actuator)
45 outflow channel (cooling medium)
46 coupling point for cooling medium discharge
50 fluidic unit
51 discharge element/plunger
52 plunger tip
53 plunger head
54 plunger contact surface
55 plunger spring
56 plunger centering piece
57 plunger bearing
58 plunger seal
60 nozzle
61 outlet opening
62 nozzle chamber
63 sealing seat
64 feed channel
65 reservoir interface
66 medium cartridge
67 cartridge holder 68 compressed air supply cartridge
69 connection cable
70 coupling mechanism
71 coupling spring
72 sphere
73 plug-in coupling part
74 spherical cap
75 heating (nozzle)
80 control unit (dosing system)
81 control unit connection cable
82 temperature sensor (medium)
83 temperature sensor (expansion material element)
84 Hall sensor
85 magnet
7 first procedure step
7-I. to 7-XIV. method steps (first procedure step)
7-i. iterative method step (first procedure step)
7-D, 7-E procedure sub-steps (first procedure step)
8 second procedure step
8-I. to 8-VI. method steps (second procedure step)
9 third procedure step
9-I. to 9-IX. method steps (third procedure step)
9-iii., 9-iv. iterative method steps (third procedure step)
9-G procedure sub-step (third procedure step)
a distance (plunger tip:nozzle)
m1, m2 ratio (plunger position:temperature)
m1', m2', m3', m4' ratio (plunger position:time)
K tilt axis
$H_1, H_2, H_3$ (hydraulic) effective stroke
R discharge direction
RS, RS' movement direction of the plunger
$S_1, S_{1'}, S_2, S_{2'}, S_3, S_4, S_5$ plunger position
$t_0$-$t_4$ points in time
$t_{0'}$-$t_{5'}$ points in time
$t_{0''}$-$t_{7''}$ points in time
$T_1, T_2$ temperature (expansion material element)
$U_1, U_2, U_3$ voltage (piezo actuator)
$\Delta U_1$ $\Delta U_1, \Delta U_2, \Delta U_3, \Delta U_4$ voltage difference/actual value

The invention claimed is:

1. A dosing system (1) for a dosing substance, which dosing system (1) comprises a housing (11) having a nozzle (60) and a feed channel (64) for the dosing substance, a discharge element (51) arranged in the housing (11) for discharging the dosing substance from the nozzle (60), at least one first actuator (20) coupled to the discharge element (51) and/or the nozzle (60), at least one second actuator (30) coupled to the first actuator (20), and a control unit (80),
the second actuator (30) being designed to set a position of an entirety of the at least one first actuator (20) relative to the housing (11) responsive to the control unit (80),
wherein the entirety of the first actuator (20) includes two opposing ends of the first actuator (20) and is movable in the housing (11) by the second actuator (30), and wherein one of the two opposing ends of the first actuator (20) is coupled to the second actuator (30) and an other one of the two opposing ends is coupled to the discharge element (51).

2. The dosing system according to claim 1, wherein the second actuator (30) is designed and arranged in the housing (11) in order to set a position of the discharge element (51) in relation to the nozzle (60) of the dosing system (1).

3. The dosing system according to claim 1, having at least one heating device (33) associated with the second actuator (30) and/or at least one cooling device (40) associated with the second actuator (30), wherein the control unit (80) is for controlling and/or regulating the heating device (33) and/or the cooling device (40).

4. The dosing system according to claim 1, wherein the dosing system (1) comprises a sensor arrangement (83, 84) having at least one of the following sensors:
 a temperature sensor (83) associated with the second actuator (30),
 a temperature sensor associated with the first actuator (20),
 a temperature sensor associated with the housing (11),
 a movement sensor (84) for determining a movement of the discharge element (51),
 a position sensor (84) for determining a position of the discharge element (51).

5. The dosing system according to claim 1, wherein the second actuator (30) comprises an expansion body (32) and/or wherein the second actuator (30) is coupled to the first actuator (20) in an axial direction for positioning of the first actuator (20).

6. The dosing system according to claim 1, wherein the dosing system (1) comprises at least one force sensor in order to determine a force exerted on the first actuator (20) by the second actuator (30).

7. The dosing system according to claim 6, wherein the force sensor is designed to determine a force exerted on the first actuator (20) in order to capture a sealing force of the discharge element (51) based thereon.

8. The dosing system according to claim 1, wherein the first actuator (20) is a piezo actuator (20) and/or wherein the second actuator (30) is an expansion material element (30).

9. The dosing system according to claim 1, the second actuator (30) being designed to set a position of the at least one first actuator (20) with respect to the discharge element (51) and/or the nozzle (60).

10. The dosing system according to claim 1, wherein the second actuator (30) is designed and arranged in the housing (11) in order to set a distance (a) between a discharge tip (52) of the discharge element (51) and a nozzle opening (61) of the nozzle (60).

11. The dosing system according to claim 1, wherein the second actuator (30) comprises an expansion body (32) and a transmitter (35) coupled therewith and/or wherein the second actuator (30) is coupled to the first actuator (20) in an axial direction for positioning of the first actuator (20) by the transmitter (35).

12. A dosing system (1) for a dosing substance, which dosing system (1) comprises:
 a housing (11) having a nozzle (60) and a feed channel (64) for the dosing substance,
 a discharge element (51) arranged in the housing (11) for discharging the dosing substance from the nozzle (60),
 at least one first actuator (20) coupled to the discharge element (51) and the nozzle (60) to change a position of the discharge element (51) to discharge or to stop discharging the dosing substance from the nozzle (60),
 at least one second actuator (30) coupled to the first actuator (20), and
 a control unit (80),
 the second actuator (30) being designed to set a position of the at least one first actuator (20) relative to the housing (11) responsive to the control unit (80),
 wherein an entirety of the first actuator (20) is movable in the housing (11) by the second actuator (30), and
 wherein the second actuator (30) is disposed in the housing (11) and is configured to expand or contract to change the position of the discharge element (51) to an adjustment position in combination with the first actuator (20), such that the discharge element (51) is pressed into the nozzle (60) with a predetermined force in the adjustment position.

\* \* \* \* \*